US009476478B2

(12) United States Patent
Staton

(10) Patent No.: US 9,476,478 B2
(45) Date of Patent: Oct. 25, 2016

(54) APPARATUS FOR DISPERSING IMPACT FORCES

(71) Applicant: Fielding B. Staton, Liberty, MO (US)

(72) Inventor: Fielding B. Staton, Liberty, MO (US)

( * ) Notice: Subject to any disclaimer, the term of this patent is extended or adjusted under 35 U.S.C. 154(b) by 0 days.

(21) Appl. No.: 14/528,099

(22) Filed: Oct. 30, 2014

(65) Prior Publication Data

US 2016/0040743 A1 Feb. 11, 2016

Related U.S. Application Data

(63) Continuation-in-part of application No. 14/310,899, filed on Jun. 20, 2014, now Pat. No. 8,899,562, which is a continuation-in-part of application No. 14/188,303, filed on Feb. 24, 2014, now Pat. No. 8,789,818, which is a continuation-in-part of application No. 13/796,170, filed on Mar. 12, 2013, now Pat. No. 8,695,955.

(60) Provisional application No. 61/928,687, filed on Jan. 17, 2014, provisional application No. 61/988,024, filed on May 2, 2014.

(51) Int. Cl.

| | |
|---|---|
| ***F41H 1/04*** | (2006.01) |
| ***F16F 13/00*** | (2006.01) |
| ***F16F 13/04*** | (2006.01) |
| ***F41C 23/06*** | (2006.01) |
| ***B60J 1/20*** | (2006.01) |
| ***G08B 21/18*** | (2006.01) |

(52) U.S. Cl.

CPC .............. *F16F 13/00* (2013.01); *B60J 1/2094* (2013.01); *F16F 13/002* (2013.01); *F16F 13/005* (2013.01); *F16F 13/04* (2013.01); *F41C 23/06* (2013.01); *G08B 21/18* (2013.01)

(58) Field of Classification Search

CPC ...... F16F 13/00; F16F 13/005; F16F 13/002; F16F 13/04; F41C 23/06

USPC .......... 267/89, 195, 204, 216, 104.13; 2/6.8, 2/411, 412, 414, 416

See application file for complete search history.

(56) References Cited

U.S. PATENT DOCUMENTS 1,383,582 A * 7/1921 Stubbs ...................... E05F 7/04 16/85
2,950,576 A 8/1960 Rubenstein
3,467,973 A 9/1969 Minnick
3,783,568 A 1/1974 Adler et al.

(Continued)

OTHER PUBLICATIONS

U.S. Appl. No. 13/796,170 select file history dated Jul. 2, 2013 through Jan. 7, 2014, 49 pages.

(Continued)

*Primary Examiner* — William Gilbert

(74) *Attorney, Agent, or Firm* — Lathrop & Gage LLP

(57) ABSTRACT

A system for mitigating an impact force is provided. The system includes a device having a first layer, a second layer, and an intervening member. The intervening member is suspended between the first and second layers via a first biasing member. A first portion of a force initially received by the first layer is transferred to the intervening member. A fraction of the force transferred to the intervening member is returned to the first layer, the fraction returned to the first layer being less than the force received by the first layer. A second portion of the force initially received by the first layer is partially transferred to the second layer, the second portion being less than the initial force received by the first layer.

18 Claims, 41 Drawing Sheets

(56) References Cited

U.S. PATENT DOCUMENTS

| | | | |
|---|---|---|---|
| 5,348,363 | A | 9/1994 | Fink |
| 7,461,726 | B2 | 12/2008 | Hawkins et al. |
| 8,303,027 | B2 | 11/2012 | Murakami et al. |
| 8,938,818 | B2 | 1/2015 | Ide et al. |

OTHER PUBLICATIONS

U.S. Appl. No. 14/310,899 select file history dated Jul. 29, 2014, 9 pages.

U.S. Appl. No. 14/188,303 select file history dated May 8, 2014 through Jun. 10, 2014, 32 pages.

* cited by examiner 29
600
19
610

APPARATUS FOR DISPERSING IMPACT FORCES

RELATED APPLICATIONS

This application claims priority to U.S. Provisional Application No. 61/928,687, filed Jan. 17, 2014 and is a continuation-in-part of U.S. application Ser. No. 14/310,899, filed Jun. 20, 2014, which claims priority to U.S. Provisional Application No. 61/988,024, filed May 2, 2014 and is a continuation-in-part of U.S. application Ser. No. 14/188,303, filed Feb. 24, 2014, now U.S. Pat. No. 8,789,818, which is a continuation-in-part of U.S. application Ser. No. 13/796,170, filed Mar. 12, 2013, now U.S. Pat. No. 8,695,955, the disclosures of which are incorporated by reference herein in their entireties.

BACKGROUND

Impact forces received upon particular materials may compromise the integrity of the material and the purpose for which it is used. For example, glass is an amorphous solid material that is used extensively in everyday life. However, glass products such as automobile windshields and home windows are particularly prone to encounter debris that may result in some degree of cracking, chipping, or even shattering (collectively "breakage"). Rocks are often encountered by automobile tires and projected at following traffic, and lawn mowers may similarly propel debris at windows (and especially those that are adjacent the ground). While manufacturing advancements have been made to improve the resilience of glass products, such improved products may be undesirably expensive and may nevertheless still be susceptible to breakage. Further, those manufacturing advancements do not aid existing products that were made with older technology.

Additionally, impact forces received upon persons may have harmful consequences. For example, a tackle in the NFL can produce up to 1600 pounds of force on a player's body. Matt Higgins, "Football Physics: The Anatomy of a Hit," *Popular Mechanics*, Dec. 9, 2009, http://www.popularmechanics.com/outdoors/sports/physics/4212171. A hit like this can cause a player's head to accelerate in his helmet at 30 to 60 g's. At 100 g's, a player will be out with a concussion. It has become increasingly important in sports for players to wear the best protective gear possible with the rising numbers of sports-related injuries, such as concussion. However, while advancements in sports gear have improved the safety of the game, players remain susceptible to head injuries where the impact force upon the player is greater than the force that the equipment can absorb.

Other types of helmets may also receive impacts, such as hard hats. Dispersion of impact forces acting upon these helmets may similarly be desirable.

Some embodiments set forth herein may inhibit glass breakage without requiring any changes to how the glass is manufactured. Other embodiments set forth herein may be incorporated in the glass manufacturing process as an alternative, or enhancement, to other anti-breakage technologies. Still other embodiments set forth herein may help disperse impact forces away from a person's body to prevent or minimize injury.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, an apparatus for inhibiting glass breakage includes a housing, a contact member, and a biasing member. The housing has a contact end with an aperture, and the contact member is disposed at least primarily inside the housing. The biasing member biases the contact member toward the housing aperture. Means for fixing the housing contact end to a glass surface are further included.

In another embodiment, a method for inhibiting glass breakage begins with obtaining an apparatus having: (a) a housing having a contact end with an aperture; (b) a contact member disposed at least primarily inside the housing; and (c) a biasing member biasing the contact member toward the housing aperture. The housing contact end is then adhered to a glass item, and impact force is transferred from the glass item to the biasing member via the contact member.

In still another embodiment, a glass product includes a sheet of glass and an apparatus for inhibiting glass breakage. The apparatus for inhibiting glass breakage includes: (a) a housing having a contact end with an aperture; (b) a contact member disposed at least primarily inside the housing; and (c) a biasing member biasing the contact member toward the housing aperture. The housing contact end is coupled to the sheet of glass, and the contact member rests upon the sheet of glass for receiving an impact force from the sheet of glass.

In yet another embodiment, a glass product includes a first sheet of glass, a second sheet of glass laminated to the first sheet of glass, and an apparatus for inhibiting glass breakage. The second sheet of glass has an opening therein, and the apparatus for inhibiting glass breakage includes: (a) a housing having a contact end with a first aperture; (b) a first contact member disposed at least primarily inside the housing; and (c) a biasing member biasing the first contact member toward the first aperture. The housing contact end is coupled to at least one of the first sheet of glass and the second sheet of glass, and the contact member passes through the opening in the second sheet of glass and rests upon the first sheet of glass for receiving an impact force from the first sheet of glass.

In another embodiment, an apparatus for dispersing impact forces includes a housing having a contact end with an aperture; a contact member located at least primarily inside the housing; a biasing member biasing the contact member toward the housing aperture; and means for securing the housing contact end to a surface. When an impact force is received upon the impact receiving surface, the force is at least partially transferred to the contact member, which in turn temporarily alters the biasing member, which subsequently returns the contact member to an initial position. The return of the contact member imparts a second force on the impact receiving surface, which is less than the impact force transferred to the contact member.

In still another embodiment an apparatus for dispersing impact forces is provided, which includes a base, a rail, a contact member for contacting an impact receiving surface, a first biasing member located between the base and the rail, and a second biasing member located between the rail and the contact member. The first biasing member biases the rail toward a rest position and the second biasing member biases the contact member toward an initial position at the impact receiving surface. An impact force received on the impact receiving surface is at least partially transferred to the contact member, which temporarily alters the second biasing member. The contact member is subsequently returned to the initial position, which imparts a second force on the impact receiving surface.

In still yet another embodiment, an apparatus for dispersing impact forces includes a base, a contact member for contacting an impact receiving surface, and a primary biasing member disposed between the base and the contact member. The primary biasing member biases the contact member toward an initial position at the impact receiving surface. An impact force received on the impact receiving surface is at least partially transferred to the contact member, which in turn temporarily alters the primary biasing member which subsequently returns the contact member to the initial position. The return of the contact member to the initial position imparts a second force on the impact receiving surface.

In still a further embodiment, a window product includes a first window pane, a second window pane, and an apparatus for dispersing impact forces. The apparatus for dispersing impact forces has a base, a contact member for contacting the first window pane, and a primary biasing member disposed between the base and the contact member. The primary biasing member biases the contact member toward an initial position at the first window pane. An impact force received on the first window pane is at least partially transferred to the contact member, which in turn temporarily alters the primary biasing member which subsequently returns the contact member to the initial position. The return of the contact member to the initial position imparts a second force on the first window pane.

In still another embodiment, an apparatus for dispersing impact forces is provided which includes a housing having a contact end with an aperture; a contact member located at least primarily inside the housing; a biasing member biasing the contact member toward the housing aperture; and a sensor. The housing contact end is secured to an impact receiving surface. The sensor initiates an alert when an impact force received on the impact receiving surface causes the contact member to shift a predetermined distance from an initial position.

Provided in still yet another embodiment is an apparatus for dispersing impact forces having a base; a contact member for contacting an impact receiving surface; a biasing member disposed between the base and the contact member; and a sensor. The biasing member biases the contact member toward an initial position at the impact receiving surface; and the sensor initiates an alert when an impact force received on the impact receiving surface causes the contact member to shift from an initial position.

In yet another embodiment, a window product includes a window pane and an apparatus for dispersing impact forces. The apparatus for dispersing impact forces has a base; a contact member positioned to receive force from the window pane; a biasing member disposed between the base and the contact member; and a sensor. The biasing member biases the contact member toward an initial position at the window pane. An impact force received on the window pane cause the contact member and the biasing member to move. The movement of the contact member or the biasing member activates the sensor, causing the sensor to initiate an alert.

In still a further embodiment is provided a monitoring system having an input device, an alarm, a processor, and electronic instructions. The input device includes a housing having a contact end with an aperture; a contact member located at least primarily inside the housing; a biasing member biasing the contact member toward the housing aperture; at least one sensor; and means for securing the housing contact end to an impact receiving surface. The processor is in data communication with the sensor, and the electronic instructions, when executed by the processor, performs steps for (a) receiving at least one signal from the sensor; (b) analyzing the at least one signal to identify a triggering event; and (c) upon identifying a triggering event, actuating the alarm.

In another embodiment of the present invention a system for mitigating an impact force is disclosed. The system includes a device having a first layer, a second layer, and an intervening member. The intervening member is suspended between the first and second layers via a first biasing member. A first portion of a force initially received by the first layer is transferred to the intervening member; a fraction of the force transferred to the intervening member is returned to the first layer, the fraction returned to the first layer being less than the force received by the first layer; and a second portion of the force initially received by the first layer is partially transferred to the second layer, the second portion being less than the initial force received by the first layer.

In still another embodiment, a system for mitigating head injuries includes a helmet. The helmet has a hard outer layer; a padded inner layer; and an intervening layer suspended between the outer layer and the inner layer via a first biasing member. An alignment member secures the outer layer to the inner layer, the alignment member being telescopic and having a second biasing member. A first portion of a force initially received by the outer layer is transferred to the intervening member; a fraction of the force transferred to the intervening member is returned to the outer layer, the fraction returned to the outer layer being less than the force received by the outer layer; and a second portion of the force initially received by the outer layer is partially transferred to the inner layer, the second portion being less than the initial force received by the outer layer.

In still yet another embodiment, a system for mitigating an impact force, includes a helmet with a face mask. The face mask has a first portion and a second portion separated by a gap and held together via a biasing member. A force received by the first portion is at least partially transferred to the second portion, and a fraction of the transferred force is returned to the first portion, the fraction being less than the force received. In still a further embodiment, a system for mitigating an impact force is provided which includes a first helmet, a plurality of proximity sensors, a plurality of electromagnets, and ferromagnetic material. The first helmet has an outer layer, an inner layer, and an impact plate suspended between the outer layer and the inner layer via a first biasing member. The proximity sensors and the electromagnets are in data communication with a processor and non-transitory computer memory. The memory includes programming to effectuate the steps of: (1) determining the proximity of the first helmet to A second helmet; (2) determining a potential impact location of the first helmet with the second helmet; and (3) actuating one or more of the electromagnets to attract the ferromagnetic material to the potential impact location. A portion of an impact force between the first and second helmets is dissipated by overcoming the electromagnet attraction of the ferromagnetic material; and another portion of the impact force is transferred to the impact plate.

DETAILED DESCRIPTION

Figure 1:
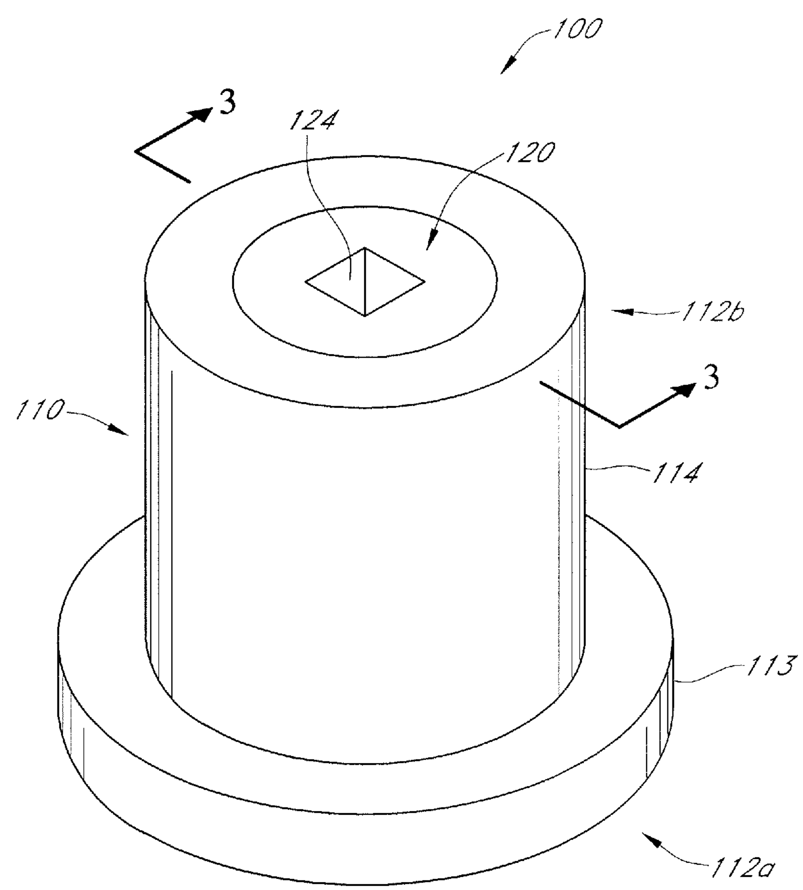
FIG. 1 is a perspective view showing an apparatus for inhibiting glass breakage according to one embodiment of the current invention, with a distal end of the apparatus visible.

FIGS. 1 through 4 show an apparatus for inhibiting glass breakage according to one embodiment 100 of the current invention. The apparatus 100 broadly includes a housing 110, a contact member 130, and a biasing member 140.

Figure 2:
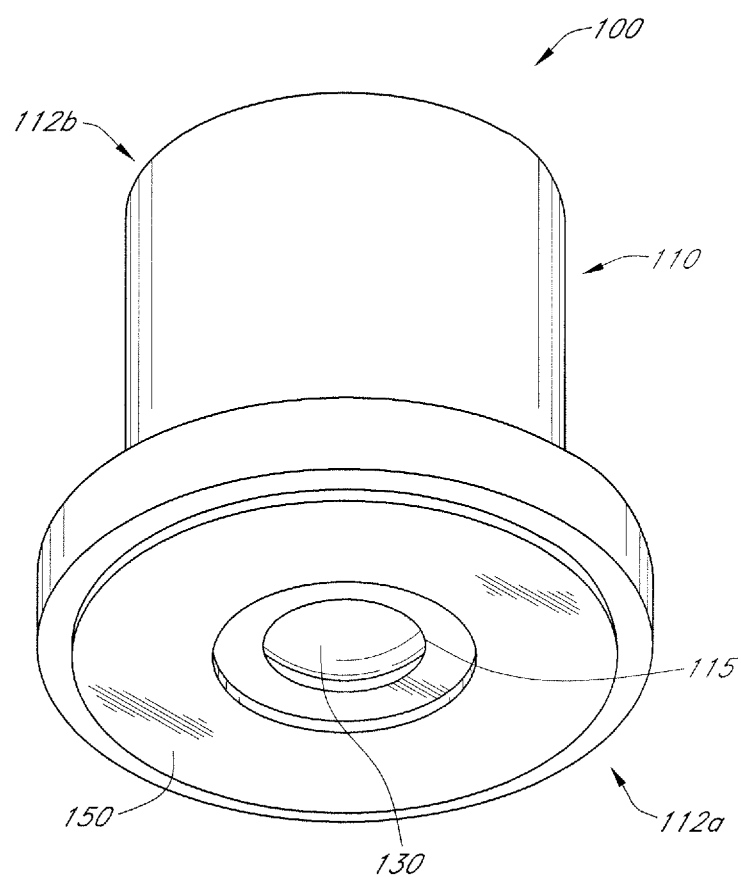
FIG. 2 is a perspective view of the apparatus of FIG. 1, with a proximal (or "contact") end of the apparatus visible.
Figure 3:
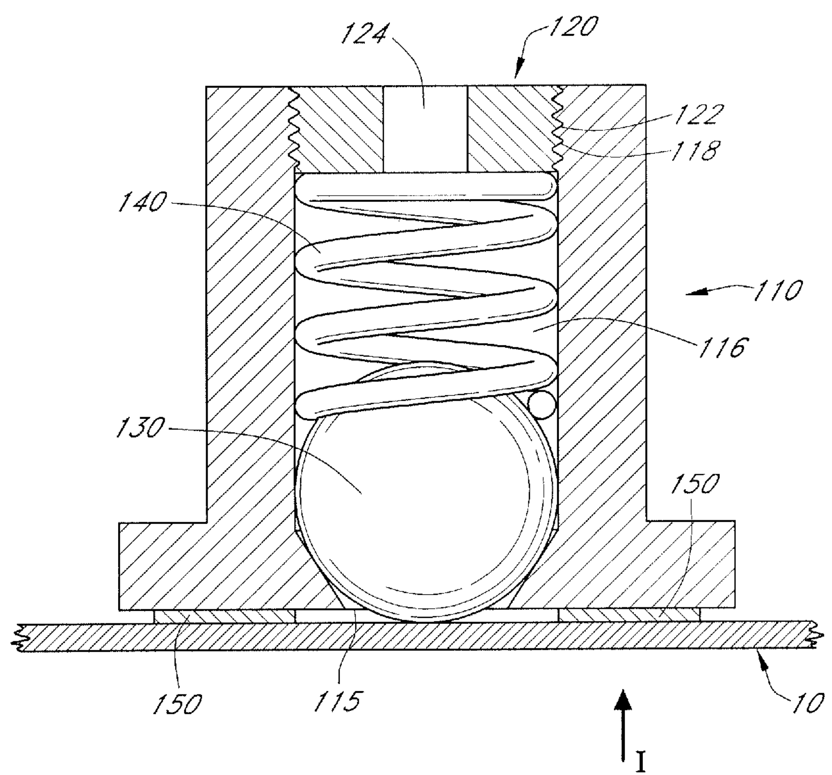
FIG. 3 is a side view of the apparatus of FIG. 1 in use, with various elements shown in section taken along line 3-3 in FIG. 1.
Figure 4:
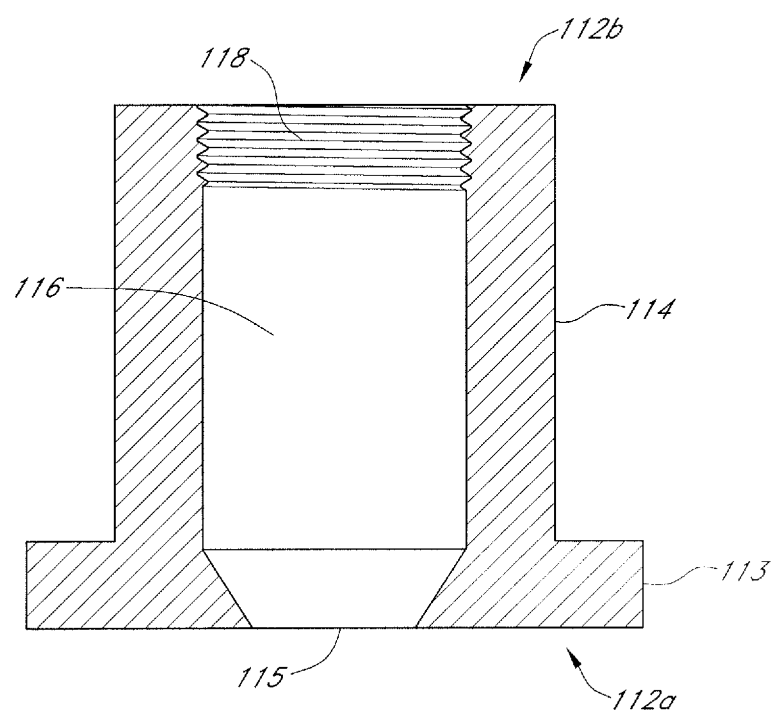
FIG. 4 is a section view of the housing of FIG. 3.

The housing 110 has a contact end 112*a* opposite a distal end 112*b*, and the contact end 112*a* has an aperture 115 (FIGS. 2 through 4). While the housing 110 may be configured in various ways, it may be desirable for the contact end 112*a* to have a surface area that is greater than a surface area of the distal end 112*b*. Such increased surface area at the contact end 112*a* may allow the housing 110 to be better coupled to a glass surface (as discussed further below) while minimizing the size of the housing 110 at the distal end 112*b*. The housing 110 is shown to have a first portion 113 extending from the contact end 112*a* and a second portion 114 extending from the distal end 112*b*, with each portion 113, 114 being generally cylindrical and extending to one another. While such configuration is currently preferred in the embodiment 100, other geometries (conical, rectangular, octagonal, irregular geometries, more or fewer portions, et cetera) may nevertheless be used.

The housing 110 may be constructed of plastic, metal, composites, and/or any other appropriate material. Moreover, various manufacturing processes may be used to form the housing, such as molding, casting, machining, and/or 3-D printing. While in some embodiments the housing 110 is formed as a unitary element, in other embodiments it may be multiple elements coupled together. For example, the first portion 113 may be fastened to the second portion 114 after each portion 113, 114 is formed.

The contact member 130 (FIGS. 2 and 3) is disposed at least primarily inside the housing 110, and specifically in a cavity 116 defined by the housing 110, and the biasing member 140 (FIG. 3) is similarly disposed in the cavity 116 and biases the contact member 130 toward the housing aperture 115. In the embodiment 100, the aperture 115 is round and smaller than the contact member 130 such that the contact member 130 cannot completely pass through the aperture 115.

As shown in FIG. 3, it may be desirable for the contact member 130 to be generally spherical to provide a single point of contact between the contact member 130 and a sheet of glass 10 with which the apparatus 100 will be used. In addition, a spherical configuration may allow the contact member 130 to be easily seated in the housing 110 at the aperture 115. Nevertheless, the contact member 130 may be configured to be shaped differently and the aperture 115 may be shaped complementary to the configuration of the contact member 130.

The contact member 130 may be constructed of entirely non-elastic material (e.g., metal). However, it may be desirable for the contact member 130 to be made at least partially of a resilient material such as rubber, or other materials such as glass. A rubberized coating on a non-elastic material may be particularly suitable, allowing some energy to be absorbed upon impact of the glass 10 and the contact member 130 yet transferring most of an impact force from the glass 10 to the biasing member 140.

The biasing member 140 in the embodiment 100 is a helical spring, as shown in FIG. 3. Other types of resilient members may alternately (or additionally) be used in different embodiments, such as a flat spring, a gas spring, a hydraulic spring, or a magnetic spring. An endcap 120 is coupled to the housing 110 to prevent the contact member 130 from exiting the housing 110, and the biasing member 140 may abut the endcap 120, as shown in FIG. 3. The housing 110 includes threading 118 (FIGS. 3 and 4), and the endcap 120 includes complementary threading 122 for coupling the endcap 120 to the housing 110. The endcap 120 may further include a passage or other element 124 for receiving a driver bit, allowing the endcap 120 to be fastened to the housing 110. While other embodiments may use fastening methods besides threading (for example, adhesive or fusing), it may be desirable for the endcap 120 to be adjustably coupled to the housing 110; such adjustment may allow an amount of force on the contact member 130 provided by the biasing member 140 to be altered as desired.

Various means may be included for fastening the housing contact end 112*a* to the glass 10 (which may or may not be generally planar). As shown in FIGS. 2 and 3, adhesive 150 may be used to couple the contact end 112*a* to the glass 10. Especially if the housing contact end 112*a* is generally flat or otherwise not of the same curvature as the glass 10, the adhesive 150 may be particularly desirable to fill the area between the contact end 112*a* and the glass 10 and provide a strong bond. Nevertheless, other embodiments may use magnetic fasteners, fusing processes, and other suitable fastening technology.

In use, the apparatus 100 is adhered to (or otherwise coupled to) the glass 10, as shown for example in FIG. 3. The biasing member 140 biases the contact member 130 toward the aperture 115, and the contact member 130 extends through the aperture 115 and contacts the glass 10. The system may remain in this configuration until the glass 10 receives an impact force I. For example, the glass 10 may be a windshield or a residential window, and flying debris may provide the impact force I. Upon receipt of the impact force I, the glass 10 may transfer at least a portion of the impact force I to the contact member 130, which in turn may move from the contact end 112*a* and transfer force to the biasing member 140. The biasing member 140 may then return to its prior configuration, moving the contact member 140 back through the aperture 115 and contacting the glass 10.

Inefficiencies in the biasing member 140, for example, may cause less than the full amount of force transferred to the contact member 130 from the glass 10 to be returned to the glass 10. This may be particularly advantageous if multiple apparatus 100 are used with the glass 10. In addition, if multiple apparatus 100 are used with the glass 10, the timing of the force transfer may vary slightly between the different apparatus 100, allowing forces to be transferred back to the glass 10 at different times. The glass 10 may be able to withstand this staggered return of forces better than the impact force I if the multiple apparatus 100 were not utilized.

Figure 5:
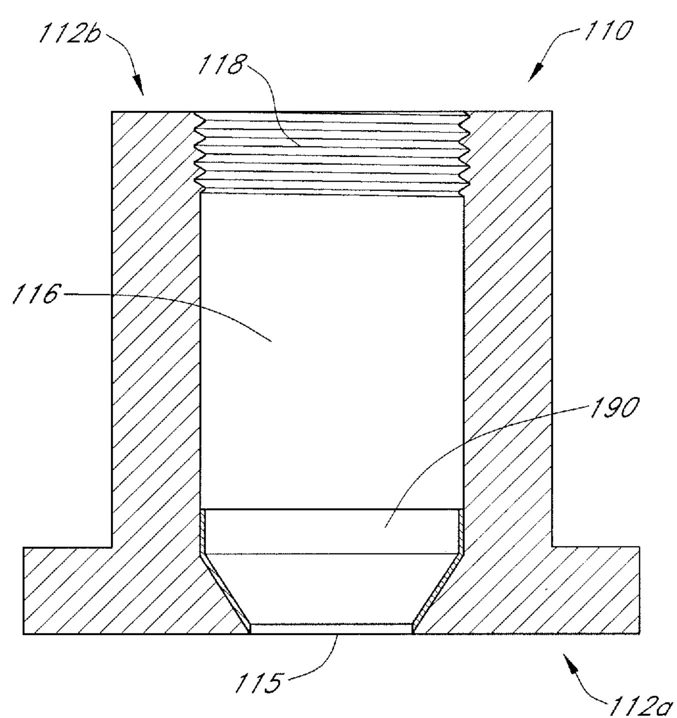
FIG. 5 is a section view showing a cushion member added inside the housing of FIG. 4.

To further dissipate the impact force I, a cushion 190 may be placed in the housing 110, as shown in FIG. 5. In such embodiments, the cushion 190 may be initially compressed when the contact member 130 contacts the glass 10. Upon movement of the contact member 130 away from the aperture 115 (and the cushion 190), the cushion 190 may expand. The cushion 190 may then absorb some force from the contact member 130 when the contact member 130 is returned to the glass 10, causing the cushion 190 to return to the compressed configuration.

The cushion 190 may be constructed of, for example, open celled polyurethane, and fast-recovery memory foam may be particularly useful. Those skilled in the art will appreciate that other materials which may quickly return to their original configuration after being compressed may similarly be used.

While the positioning of the apparatus 100 may vary (based, for example, on the type of glass application), in some embodiments where the glass 10 is a windshield, multiple apparatus 100 may be dispersed along a perimeter of the glass 10 and/or behind the rear view mirror so as not to unnecessarily obstruct the driver's view.

Figure 6:
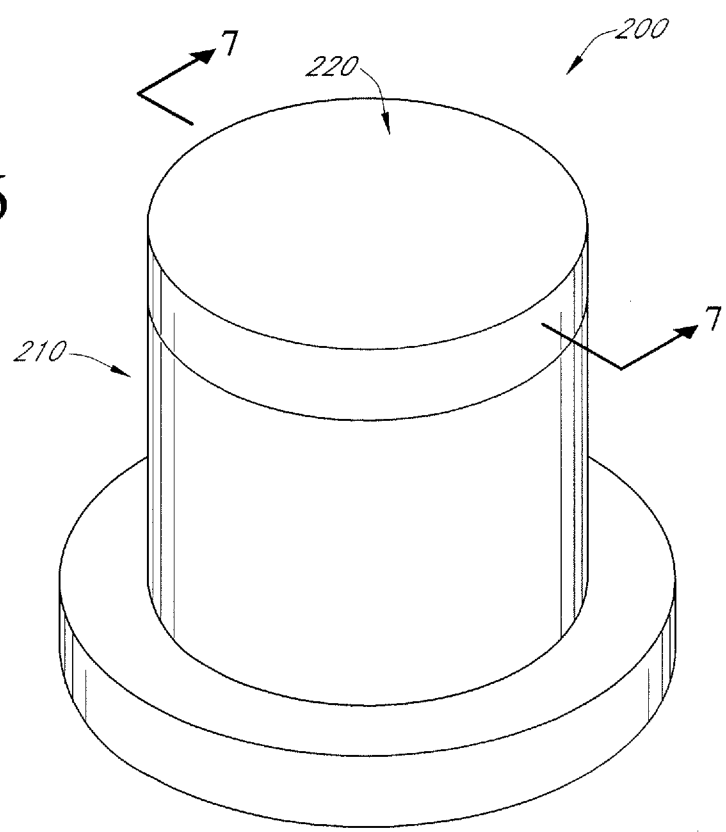
FIG. 6 is a perspective view showing an apparatus for inhibiting glass breakage according to another embodiment of the current invention, with a distal end of the apparatus visible.
Figure 7:
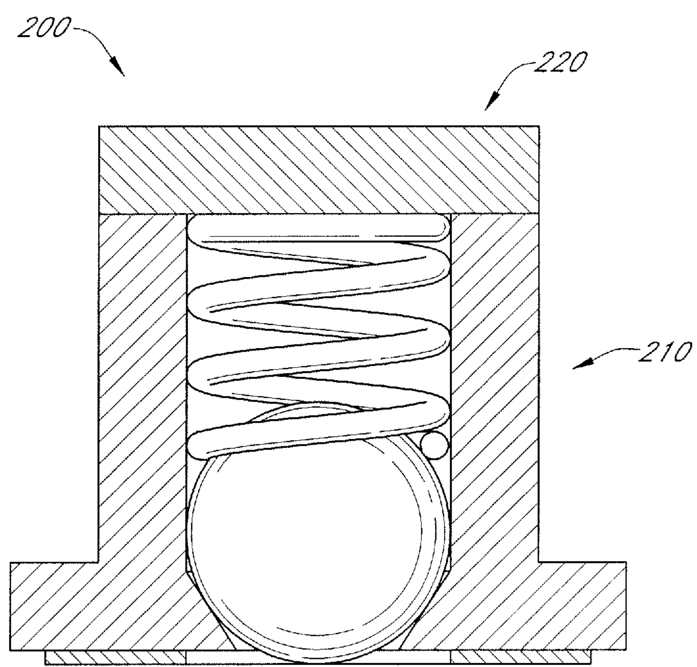
FIG. 7 is a side view of the apparatus of FIG. 6, with various elements shown in section taken along line 7-7 in FIG. 6.
Figure 8:
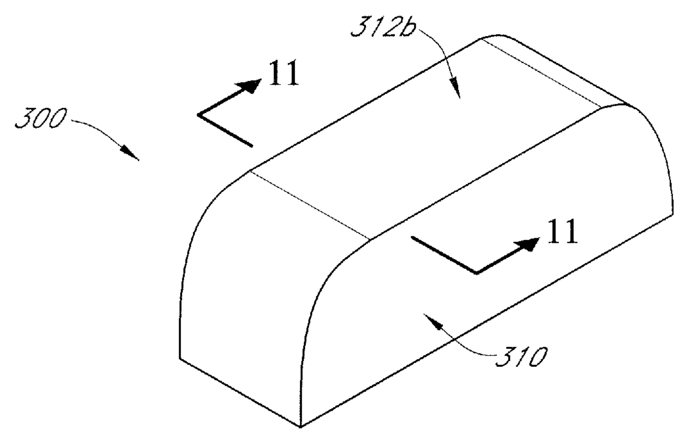
FIG. 8 is a perspective view showing an apparatus for inhibiting glass breakage according to still another embodiment of the current invention, with a distal end of the apparatus visible.

FIGS. 6 and 7 show another apparatus 200 for inhibiting glass breakage that is substantially similar to the embodiment 100, except as specifically noted and/or shown, or as would be inherent. Further, those skilled in the art will appreciate that the embodiment 100 (and thus the embodiment 200) may be modified in various ways, such as through incorporating all or part of any of the various described embodiments, for example. For uniformity and brevity, reference numbers between 200 and 299 may be used to indicate parts corresponding to those discussed above numbered between 100 and 199 (e.g., housing 210 corresponds generally to the housing 110), though with any noted or shown deviations.

In embodiment 200, endcap 220 is fused to housing 210. For example, the housing 210 and the endcap 220 may be plastic coupled together through friction welding or ultrasonic welding.

FIGS. 8 through 11 show another apparatus 300 for inhibiting glass breakage that is substantially similar to the embodiment 100, except as specifically noted and/or shown, or as would be inherent. Further, those skilled in the art will appreciate that the embodiment 100 (and thus the embodiment 300) may be modified in various ways, such as through incorporating all or part of any of the various described embodiments, for example. For uniformity and brevity, reference numbers between 300 and 399 may be used to indicate parts corresponding to those discussed above numbered between 100 and 199 (e.g., housing 310 corresponds generally to the housing 110), though with any noted or shown deviations.

Figure 9:
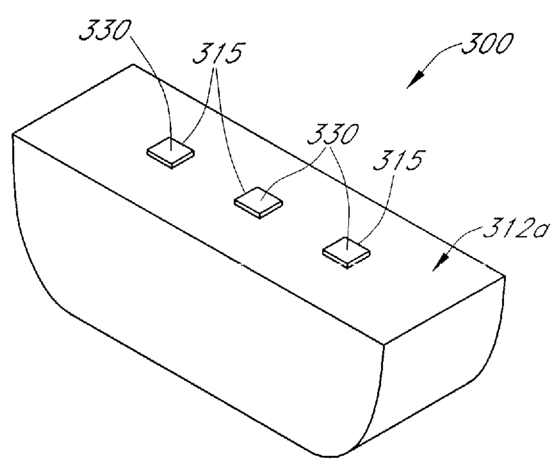
FIG. 9 is a perspective view of the apparatus of FIG. 8, with a proximal (or "contact") end of the apparatus visible.
Figure 10:
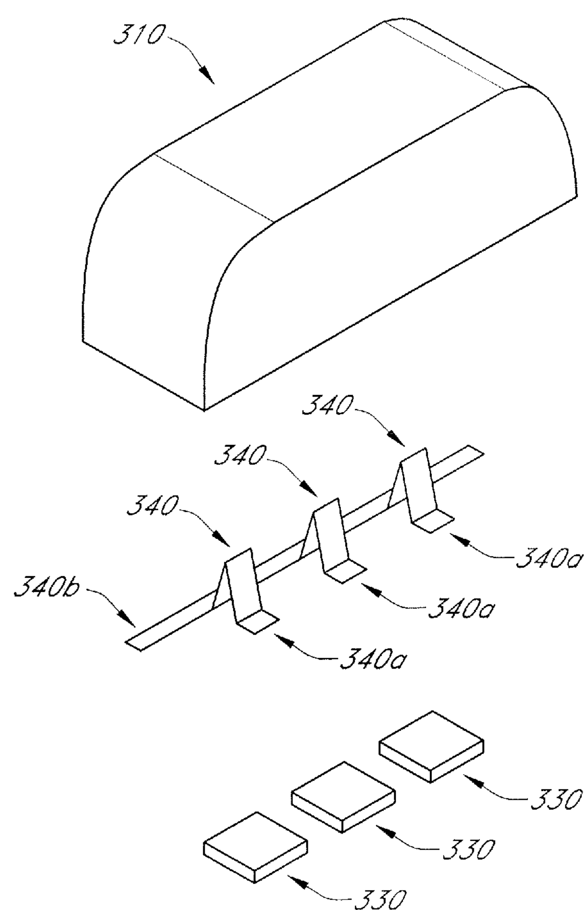
FIG. 10 is an exploded view of the apparatus of FIG. 8, with contact members and biasing members separated from a housing.

In embodiment 300, the housing 310 is sized to contain more than one of the contact members 330. Further, as shown in FIG. 9, the housing contact end 312*a* has more than one of the apertures 315, and the apparatus 300 may further include at least one cushion 390 (FIG. 11) inside the housing 310 associated with each aperture 315. While embodiment 300 has three rectangular apertures 315, a generally rectangular contact end 312*a*, and a rounded distal end 312*b*, the housing 310 can be configured in various ways (as noted regarding the embodiment 100) and may include more or fewer apertures 315 of any appropriate shape to correspond to the contact member(s) 330. And while the drawings show the housing 310 to be a unitary member, it may generally be formed of multiple segments coupled together during a manufacturing process.

The contact members 330 are disposed at least primarily inside the housing 310, with each of the contact members 330 being associated with (and biased toward) a respective aperture 315. The embodiment 300 includes rectangular contact members 330 each having a recess 331 (FIG. 11), and the apertures 315 are smaller than the contact members 330 such that the contact members 330 cannot completely pass through the apertures 315. Such sizing may be particularly desirable when the apparatus 300 is for "aftermarket" use (i.e., when the glass product is not sold with the apparatus 300).

Figure 11:
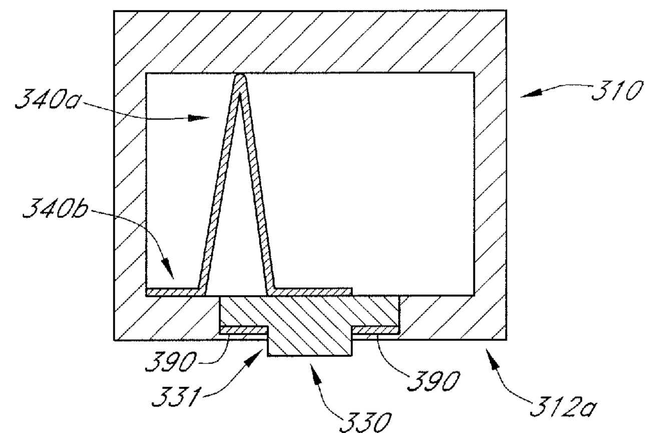
FIG. 11 is a section view of the apparatus of FIG. 8, taken along line 11-11 in FIG. 8.

When multiple contact members 330 are included, they may be biased toward the apertures 315 by a single biasing member 340, or by multiple biasing members 340. The embodiment 300 includes multiple biasing members 340, shown to be flat springs 340*a* coupled to one another by a rail 340*b*. More particularly, the embodiment 300 includes a piece of stamped metal bent to define the flat springs 340*a*. While FIG. 11 shows an upper end of a respective flat spring 340*a* touching the housing 310, other embodiments employing flat springs 340*a* may include a spacing between the spring upper ends and the housing 310. And, as discussed above regarding the embodiment 100, other types of biasing members 310 may be used.

Figure 12:
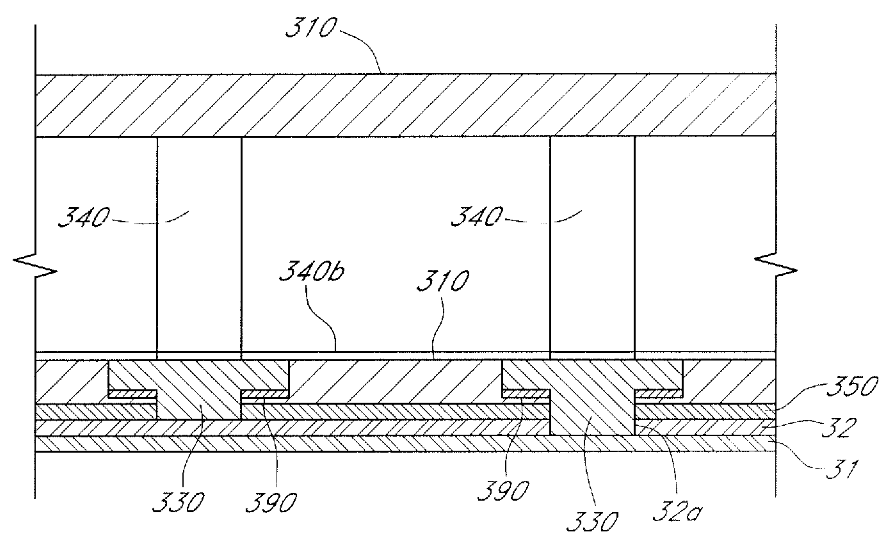
FIG. 12 is a section view of one embodiment of a glass product incorporating the apparatus of FIG. 8.

FIG. 12 shows the apparatus 300 in one method of use, and a resulting glass product. First and second sheets of glass 31, 32 may be spaced apart or laminated together (as shown). Windshield applications, for example, may include lamination; window applications, for example, may include spacing. The second sheet of glass has at least one opening 32*a* therein, and the contact end 312*a* of the housing 310 is coupled to at least one of the sheets 31, 32. One of the contact members 330 passes through a respective opening 32*a* and rests upon the first sheet 31 for receiving an impact force from the first sheet 31. Another of the contact members 330 rests upon the second sheet 32 for receiving an impact force from the second sheet 32. Forces from each sheet 31, 32 are transferred generally as described above regarding FIGS. 1 through 5. By receiving at least a portion of an impact force from the sheet 31, the apparatus 300 may be better able to prevent breakage than if only the sheet 32 were contacted.

Figure 12A:
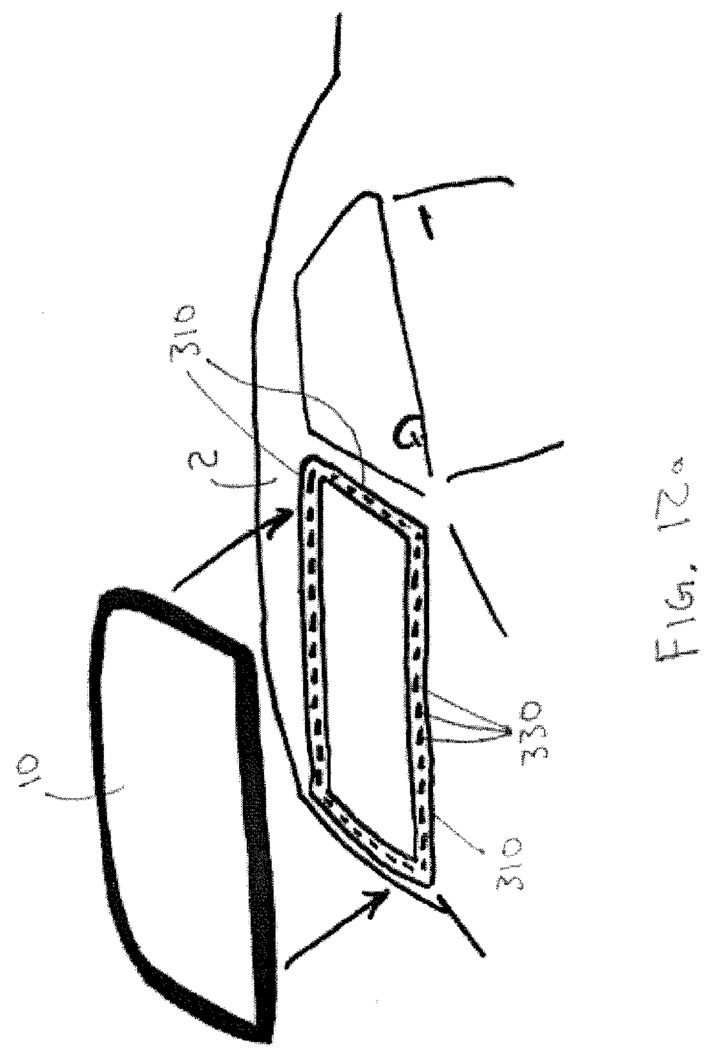
FIG. 12*a* is an exploded view showing another embodiment of the apparatus of FIG. 8 in an example use.

FIG. 12*a* shows the apparatus 300 configured as a ribbon (i.e., with the housing 310 elongated and having a reduced distance between ends 312*a*, 312*b*) and positioned between the windshield 10 and an automobile body 2. In such embodiments, the windshield 10 may be directly installed atop the apparatus 300.

Figure 13:
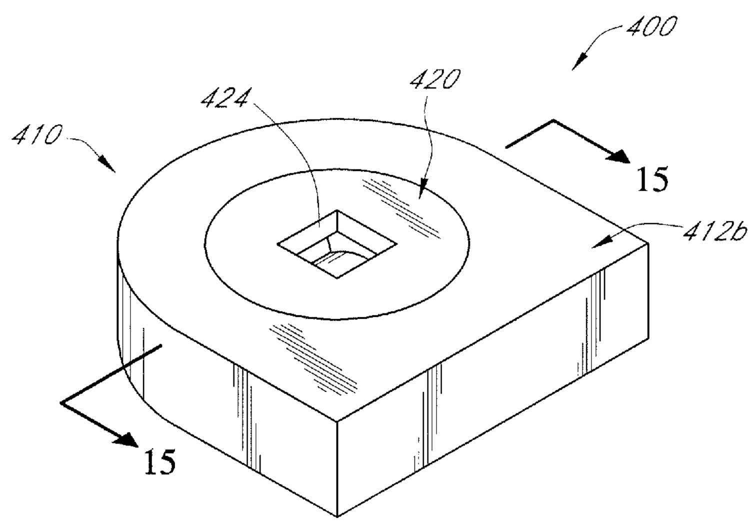
FIG. 13 is a perspective view showing an apparatus for inhibiting glass breakage according to yet another embodiment of the current invention, with a distal end of the apparatus visible.
Figure 14:
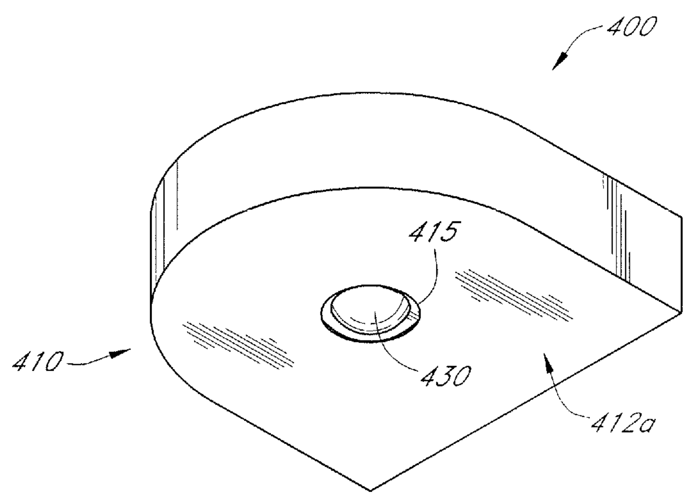
FIG. 14 is a perspective view of the apparatus of FIG. 13, with a proximal (or "contact") end of the apparatus visible.
Figure 15:
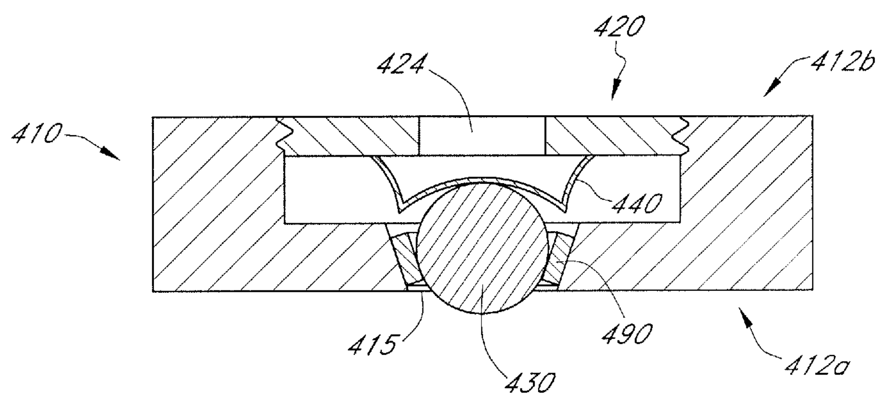
FIG. 15 is a section view of the apparatus of FIG. 13, with various elements shown in section taken along line 15-15 in FIG. 13.

FIGS. 13 through 15 show another apparatus 400 for inhibiting glass breakage that is substantially similar to the embodiment 100, except as specifically noted and/or shown, or as would be inherent. Further, those skilled in the art will appreciate that the embodiment 100 (and thus the embodiment 400) may be modified in various ways, such as through incorporating all or part of any of the various described embodiments, for example. For uniformity and brevity, reference numbers between 400 and 499 may be used to indicate parts corresponding to those discussed above numbered between 100 and 199 (e.g., housing 410 corresponds generally to the housing 110), though with any noted or shown deviations.

In embodiment 400, the housing 410 is configured as a rear view mirror mount, such that the housing 410 may be coupled to a windshield and a rear view mirror may in turn be coupled to the housing 410. While it may be particularly desirable for the housing 410 to be constructed of metal, other materials (e.g., plastic, ceramic, or glass) may alternately be used. The biasing member 440 shown in FIG. 15 is another type of flat spring. But, as noted above, other types of biasing members may be used.

Figure 16:
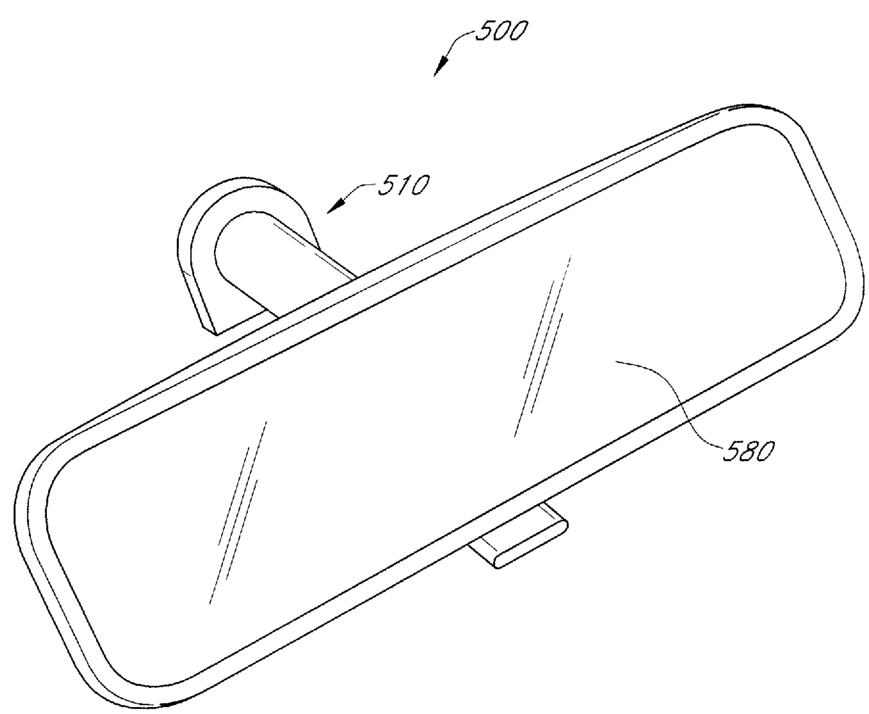
FIG. 16 is a perspective view showing an apparatus for inhibiting glass breakage according to still yet another embodiment of the current invention.
Figure 17:
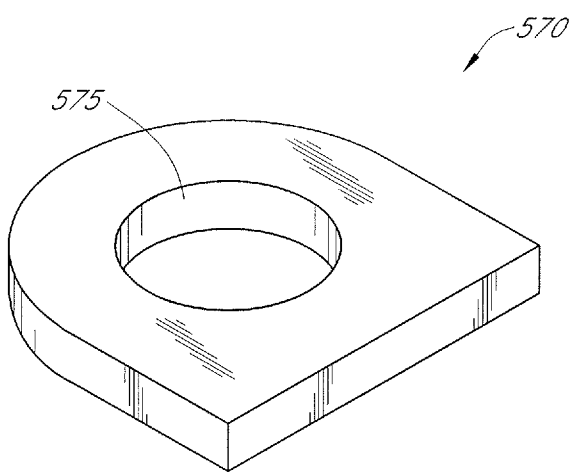
FIG. 17 is a perspective view showing a mount of the apparatus of FIG. 16.
Figure 18:
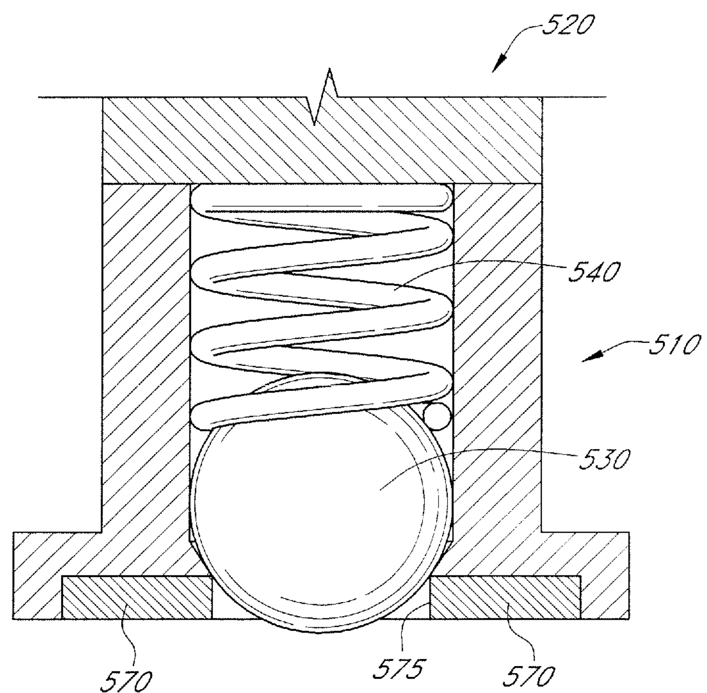
FIG. 18 is a section view of part of the apparatus of FIG. 16, with various elements shown in section.

FIGS. 16 through 18 show another apparatus 500 for inhibiting glass breakage that is substantially similar to the embodiment 100, except as specifically noted and/or shown, or as would be inherent. Further, those skilled in the art will appreciate that the embodiment 100 (and thus the embodiment 500) may be modified in various ways, such as through incorporating all or part of any of the various described embodiments, for example. For uniformity and brevity, reference numbers between 500 and 599 may be used to indicate parts corresponding to those discussed above numbered between 100 and 199 (e.g., housing 510 corresponds generally to the housing 110), though with any noted or shown deviations.

In embodiment 500, the housing 510 is configured to attach to a rear view minor mount 570, such that the housing 510 overlays the mount 570 for example. And in the embodiment 500, endcap 520 is shown fused to the housing 510. The endcap 520 may extend to a minor portion 580, and a ball and socket joint or other structure may be utilized to allow positioning of the minor portion 580 to be easily adjusted. In other embodiments, the housing 510 may extend to the minor portion 580 (with any adjustment elements included), and other structure (e.g., set screws or removable plates) may be used to support the biasing member 540. A cushion corresponding to the cushion 190 may of course be included in the housing 510.

In use, the mount 570 is coupled to a windshield, and the housing 510 is coupled to the mount 570 such that the contact member 530 passes through a hole 575 in the mount 570 and rests on the windshield. Force transfer may occur generally as set forth above to inhibit glass breakage, and the mirror portion 580 may be used in a traditional manner to improve a user's view.

Figure 19:
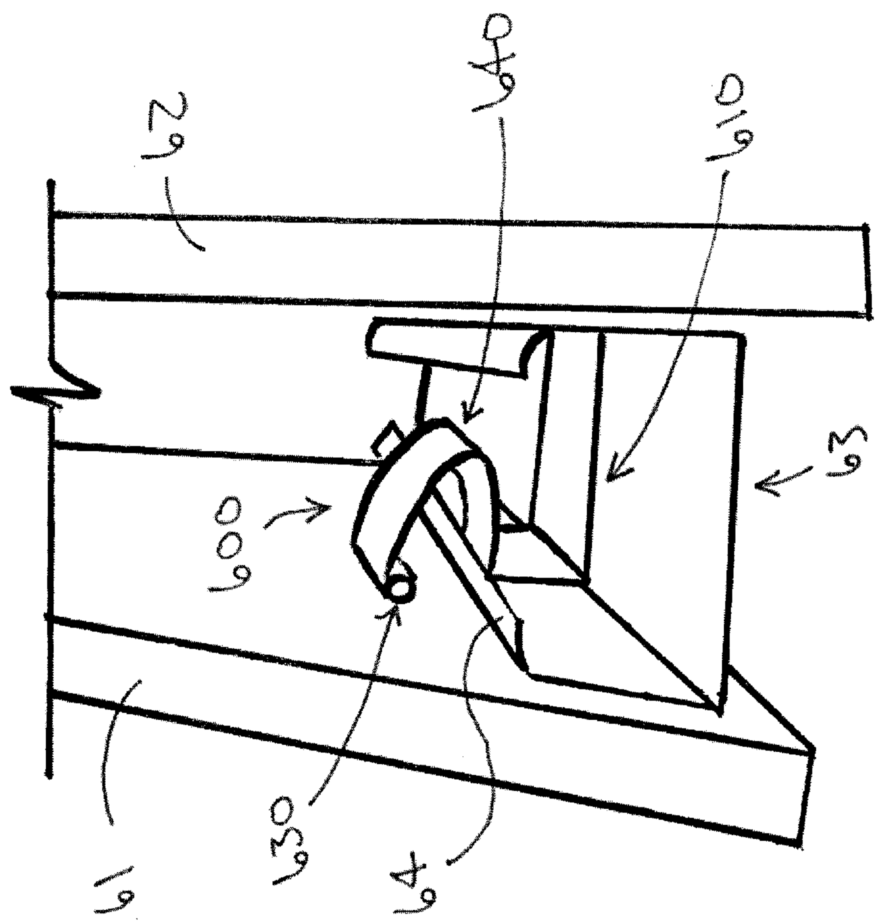
FIG. 19 is a perspective view of an apparatus for inhibiting glass breakage and a resulting glass product according to a further embodiment of the current invention.
Figure 20:
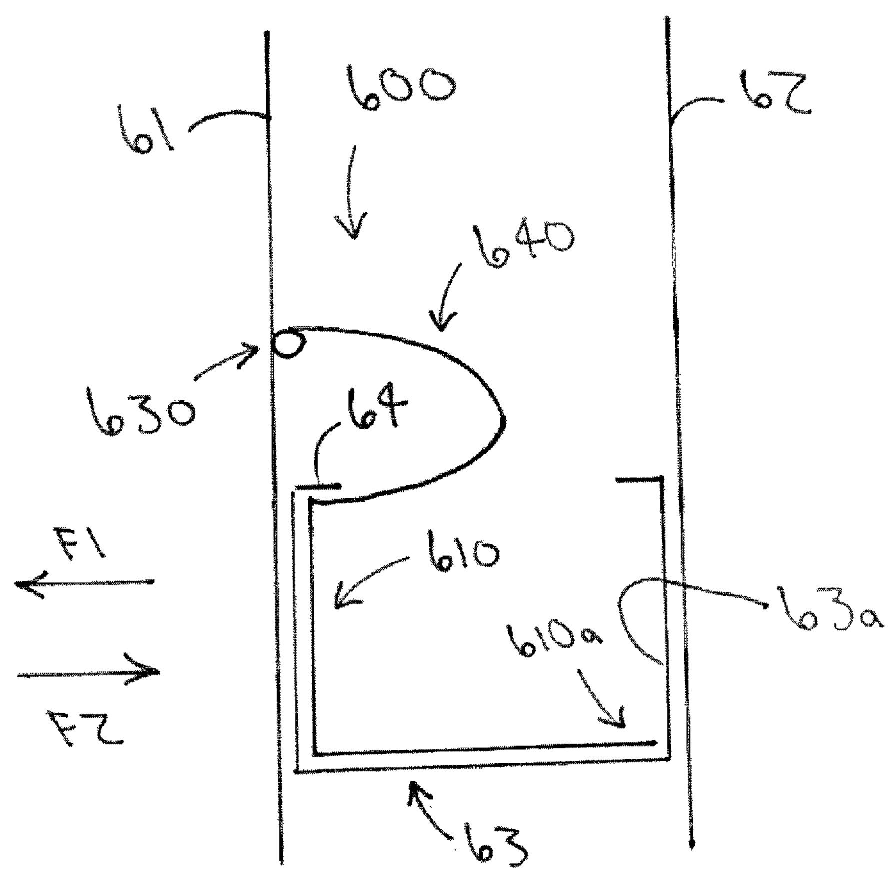
FIG. 20 is a side view of the apparatus and resulting glass product of FIG. 19.

FIGS. 19-20 show another apparatus 600 for inhibiting glass breakage in one method of use, and a resulting glass product. First and second sheets of glass 61, 62 are spaced apart by a spacer 63 that includes a ledge 64. A bonding agent (not shown) may couple the spacer 63 to the glass 61, 62. The apparatus 600 includes a base portion 610, a contact member 630, and a biasing member 640. In some embodiments, the base portion 610, the contact member 630, and the biasing member 640 are all made of a continuous, unitary material (e.g., resilient metal, resilient plastic, et cetera), either with or without an overlying coating; in other embodiments, one or more of the portions 610, 630, 640 are formed separately and coupled to the other portions (e.g., by adhesive, welding, et cetera). The base portion 610 is configured to interact with the ledge 64 to maintain the base portion 610 stationary relative to the glass 61, 62 and the spacer 63. Adhesive or other fastening methods may or may not be used to further fix the base portion 610 to the spacer 63, and distal end 610*a* of the base portion 610 may or may not extend to spacer face 63*a*.

Continuing, the contact member 630 abuts the glass 61, and the biasing member 640 biases the contact member 630 toward the glass 61. As shown in FIGS. 19-20, it may be desirable for the contact member 630 to be generally round to provide a single point of contact between the contact member 630 and the glass 61. Nevertheless, the contact member 630 may be configured to be shaped differently. As with the contact member 130 described above, rubber and glass may also be suitable materials for the contact member 630. Rubberized coatings on resilient or non-resilient materials may further be acceptable. The apparatus 600 in FIGS. 19-20 is formed of a unitary sheet of material bent to define the base portion 610, the contact member 630, and the biasing member 640, and one end of the sheet is rolled to define the contact member 630.

The biasing member 640 specifically causes the contact member 630 to impart a first force in direction F1 on the glass 61, and the system may remain in this configuration until the glass 61 receives an impact force in direction F2 (e.g., imparted by flying debris). Upon receipt of the impact force F2, the glass 61 may transfer at least a portion of the impact force F2 to the contact member 630, which in turn may transfer force to the biasing member 640. The biasing member 640 may then return part of the force F2 to the glass 61 via the contact member 630. In some embodiments, the contact member 630 may move from the glass 61 upon receiving the portion of the impact force F2.

Inefficiencies in the biasing member 640, for example, may cause less than the full amount of force transferred to the contact member 630 from the glass 61 to be returned to the glass 61. This may be particularly advantageous if multiple apparatus 600 are used with the glass 61. In addition, if multiple apparatus 600 are used with the glass 61, the timing of the force transfer may vary slightly between the different apparatus 600, allowing forces to be transferred back to the glass 61 at different times. The glass 61 may be able to withstand this staggered return of forces better than the impact force F2 if the multiple apparatus 600 were not utilized.

To further dissipate the impact force F2, a cushion may be coupled to the contact member 630 (e.g., using adhesive or other appropriate fastening devices and methods). In such embodiments, the cushion may be initially compressed when the contact member 630 contacts the glass 61. Upon movement of the contact member 630 away from the glass 61, the cushion may expand. The cushion may then absorb some force from the contact member 630 when the contact member 630 is returned to the glass 61, causing the cushion to return to the compressed configuration. The cushion may be constructed of, for example, open celled polyurethane, and a fast-recovery memory foam may be particularly useful. Those skilled in the art will appreciate that other materials which may quickly return to their original configuration after being compressed may similarly be used.

Figure 21:
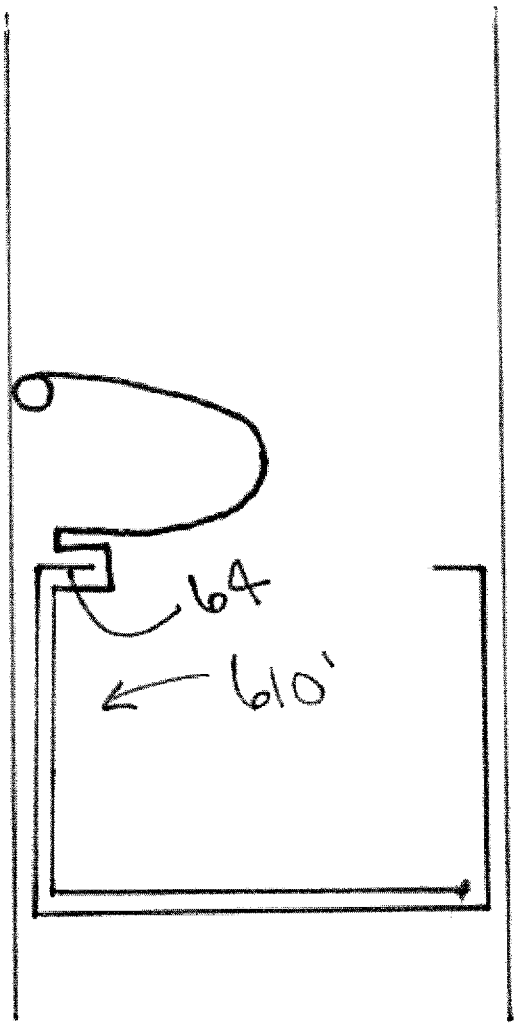
FIG. 21 shows an alternate base portion for use in the apparatus of FIG. 19.

FIG. 21 shows an alternate base portion 610' for use in the apparatus 600. The alternate base portion 610' illustrates that various configurations may be appropriate for interacting with the ledge 64.

Figure 22:
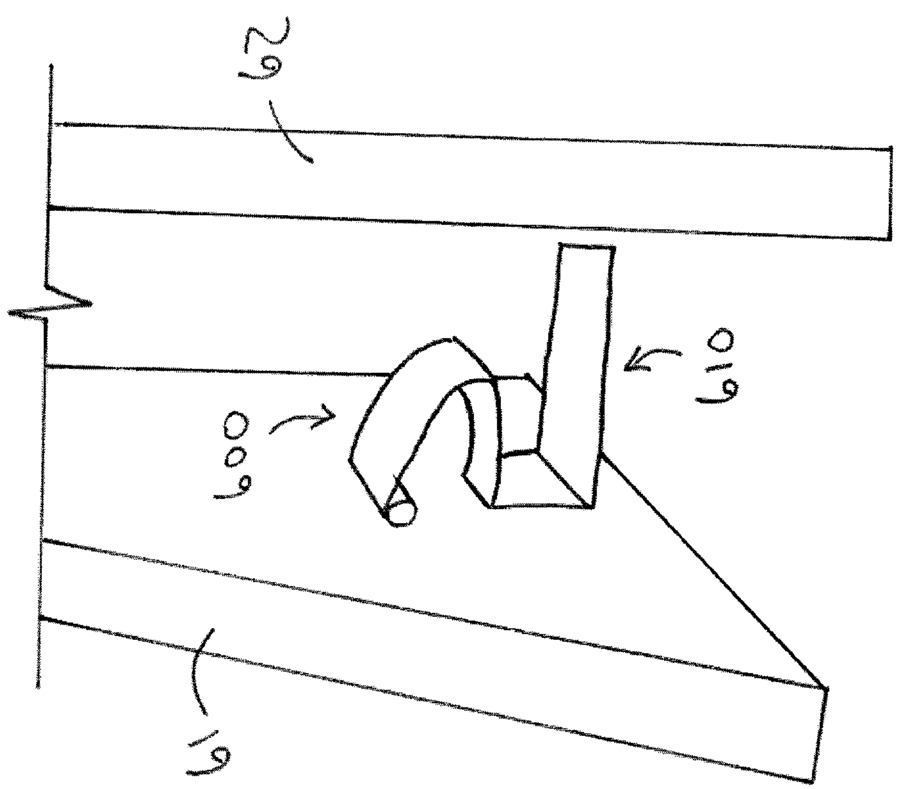
FIG. 22 is a perspective view of an apparatus for inhibiting glass breakage and a resulting glass product according to a still further embodiment of the current invention.

FIG. 22 shows the apparatus 600 for inhibiting glass breakage and a resulting glass product (slightly exploded) that is substantially similar to as described above regarding embodiment 600, except as specifically noted and/or shown, or as would be inherent. In FIG. 22, the spacer 63 is not present (or at least not utilized). As such, the base portion 610 extends in a pressure fit between glass sheets 61, 62. Adhesive or other fastening methods may or may not be used to further fix the base portion 610 to the glass 61, 62.

Figure 22A:
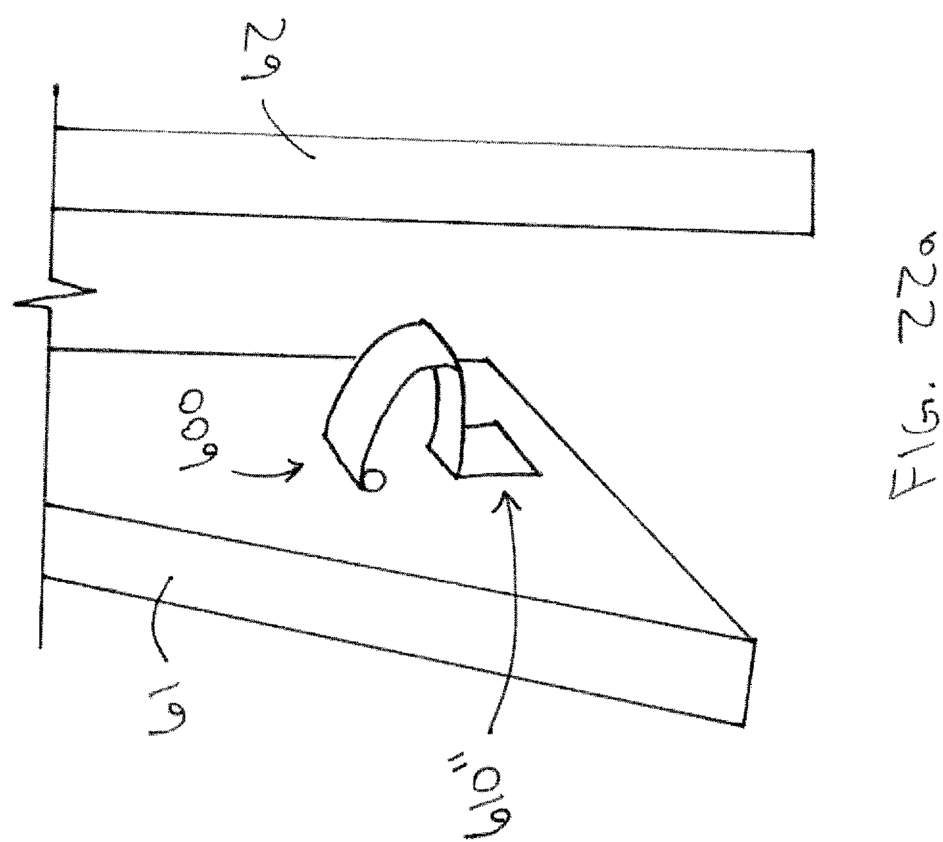
FIG. 22*a* shows an alternate base portion for use in the apparatus of FIG. 19.

FIG. 22*a* shows another alternate base portion 610" for use in the apparatus 600. Here, alternate base portion 610" is coupled to the glass sheet 61 (e.g., by adhesive). The alternate base portion 610" illustrates that various base configurations may be appropriate for interacting with the glass 61, 62 (or the spacer 63).

Figure 23:
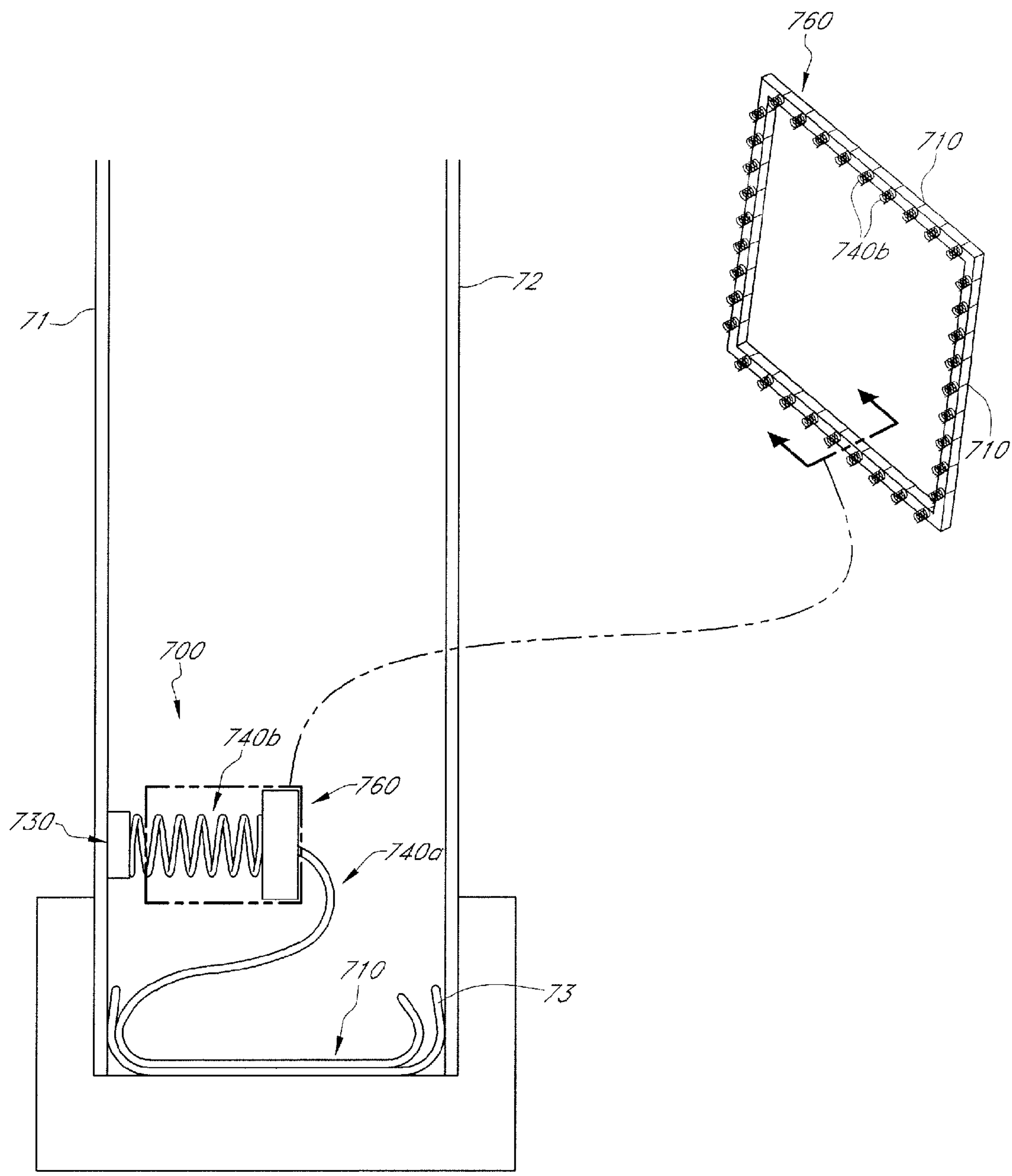
FIG. 23 is a perspective view of an apparatus for inhibiting glass breakage and a resulting glass product according to still yet another embodiment of the current invention.

FIG. 23 shows another apparatus 700 for inhibiting glass breakage in one method of use that is substantially similar to embodiment 600, except as specifically noted and/or shown, or as would be inherent. Further, those skilled in the art will appreciate that the embodiment 700 (and thus the embodiment 600) may be modified in various ways, such as through incorporating all or part of any of the various described embodiments, for example. For uniformity and brevity, reference numbers between 700 and 799 may be used to indicate parts corresponding to those discussed above numbered 600-699 (e.g, contact member 630 corresponds generally to contact member 730) though with any noted or shown deviations. In an embodiment, the apparatus 700 includes a base portion 710, a contact member 730, a first biasing member 740*a*, a second biasing member 740*b*, and a rail 760.

The rail 760 may be a piece of material extending around the perimeter of a window frame between a first sheet of glass 71 and a second sheet of glass 72 or may be, for example, a grid pattern visible through the glass 71, 72. The first and second sheets of glass 71, 72 may be spaced apart by a spacer 73. The base portion 710 may, for example, fit snugly within the spacer 73 between the first and second sheets of glass 71, 72. The first biasing member 740*a* abuts the rail 760. The second biasing member 740*b* extends from the rail 760 to the contact member 730, and the contact member 730 abuts the first sheet of glass 71. The first biasing member 740*a* biases against the rail 760, which supports the second biasing member 740*b*, which biases the contact member 730 toward the glass 71.

When a force is received against the first sheet of glass 71, at least a portion of the force is transferred to the contact member 730. The contact member 730 pushes against the second biasing member 740*b* which causes temporary deformation of the second biasing member 740*b* as it pushes against the rail 760 and may allow the contact member 730 to separate from the glass 71. If the force upon the first sheet of glass 71 is great enough, then the force transferred to the rail 760 by the second biasing member 740*b* may be sufficient to cause temporary deformation of the first biasing member 740*a* and movement of the rail 760. The first biasing member 740*a*, the rail 760, the second biasing member 740*b*, and the contact member 730 may eventually each return to their initial positions. As described above, cushions may be used (e.g., with the contact member 730), and the amount of force transferred back to the first sheet of glass 71 may be less than the force initially received. Additionally, as set forth in FIG. 23, multiple base portions 710, biasing members 740*a*, 740*b*, and contact members 730 may be associated with the rail 760.

Figure 24:
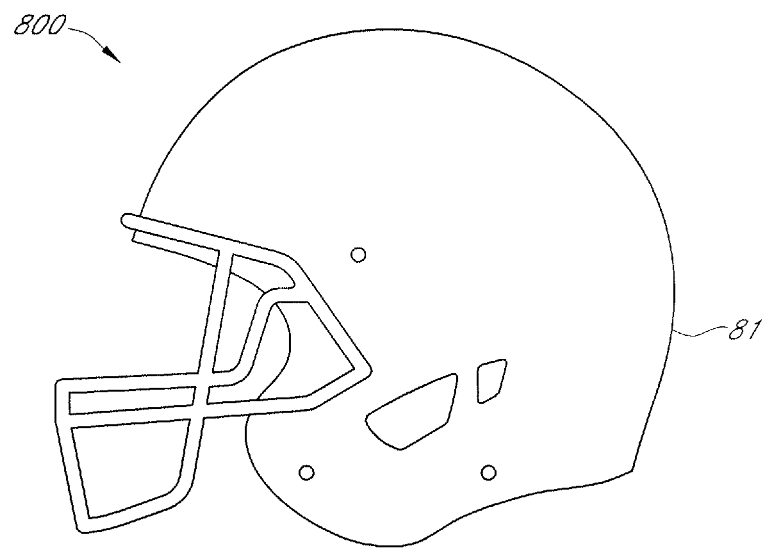
FIG. 24 is a side view of a helmet, according to another embodiment of the current invention.
Figure 25:
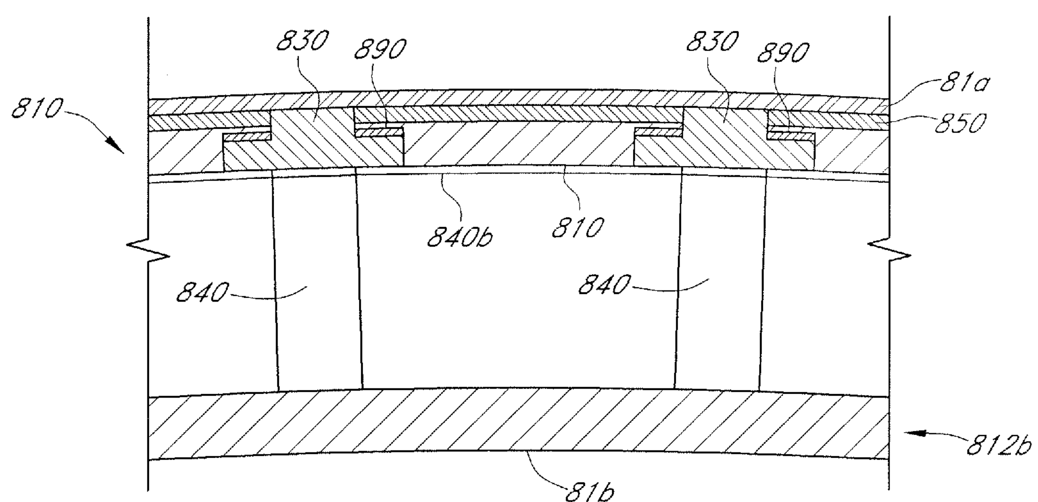
FIG. 25 is a section view of an apparatus for dispersing impact forces as applied to the helmet of FIG. 34, according to another embodiment of the current invention.

FIGS. 24-25 show another apparatus 800 for dispersing impact forces that is substantially similar to the embodiment 100, except as specifically noted and/or shown, or as would be inherent. Further, those skilled in the art will appreciate that the embodiment 100 (and thus embodiment 800) may be modified in various ways, such as through incorporating all or part of any of the various described embodiments, for example. For uniformity and brevity, references numbers between 800 and 899 may be used to indicate parts corresponding to those discussed above numbered between 100 and 199 (e.g., housing 810 corresponds generally to housing 110), though with any noted or shown deviations.

FIG. 25 shows the apparatus 800 in one method of use, e.g. located between an inside layer 81*a* and an outside layer 81*b* of a helmet 81, and specifically a football helmet (although this is not limited to football helmets). The housing 810 may be coupled to a helmet 81 such that the contact member 830 rests on the outer layer 81*a* of the helmet 81. Alternately, the housing 810 may be coupled to a helmet 81 such that the contact member 830 rests on the inside layer 81*b* of the helmet 81.

A cushion 890 may be included in the housing 810. Force transfer may occur generally as set forth above to dispel impact forces (though here the impact forces are acting on the outside of the helmet 81 instead of on the glass 10). In some embodiments, the distal end 812*b* of the housing 810 is the helmet inside layer 81*b*. In other embodiments, the distal end 812*b* is distinct from (and either adjacent to or spaced apart from the helmet inside layer 81*b*). In embodiments, where the distal end 812*b* is distinct from—and spaced apart from—the helmet inside layer 81*b*, appropriate padding (whether now known or later developed) may be located between the distal end 812*b* and the helmet inside layer 81*b*. Examples of appropriate padding include paddings currently used in athletic and work helmets.

While the positioning of the apparatus 800 may vary (based, for example, on the type of helmet), multiple apparatus 800 may be dispersed between the inner layer 81*b* and the outer layer 81*a*. Furthermore, the apparatus 800 may be alternately positioned, for example, several apparatus 800 may be coupled to the helmet 81 such that the contact member 830 rests on the outside layer 81*a* of the helmet, and several apparatus 800 may be coupled to the helmet 81 such that the contact member 830 rests on the inside layer 81*b* of the helmet 81. This configuration may help to dispel impact forces coming from more than one direction (i.e., the forces acting upon the outside surface of the helmet and the forces acting upon the inside surface of the helmet from a person's head).

Figure 26:
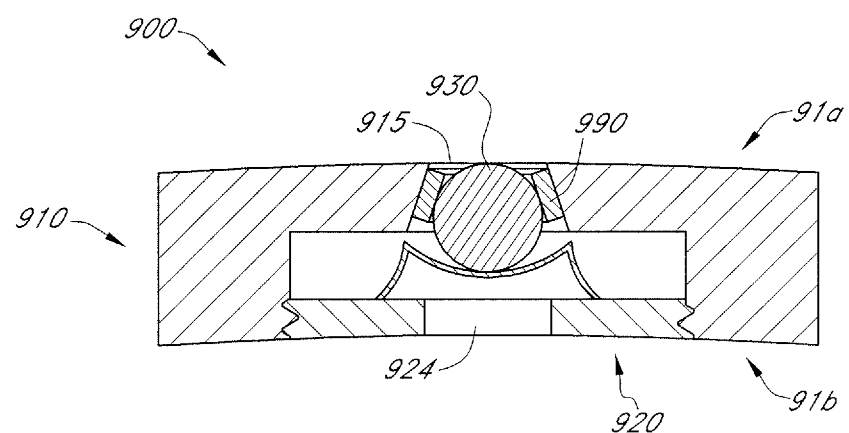
FIG. 26 is a section view of an apparatus for dispersing impact forces as applied to the helmet of FIG. 34, according to yet another embodiment of the current invention.

FIG. 26 shows another embodiment of an apparatus 900 for dispersing impact forces that is substantially similar to the embodiment 800, except as specifically noted and/or shown, or as would be inherent. Further, those skilled in the art will appreciate that the embodiment 800 (and thus embodiment 900) may be modified in various ways, such as through incorporating all or part of any of the various described embodiments, for example. For uniformity and brevity, reference numbers between 900 and 999 may be used to indicate parts corresponding to those discussed above numbered between 800 and 899 (e.g., housing 810 corresponds generally to housing 910), though with any noted or shown deviations.

In use, the apparatus 900 may be located between an inside layer 91*b* and an outside layer 91*a* of a helmet (shown in FIG. 24). The housing 910 may be coupled to the helmet such that the contact member 930 rests on the outer layer 91*a* of the helmet. Alternatively, the housing 910 may be coupled to the helmet such that the contact member 930 rests on the inside layer 91*b* of the helmet. A cushion 990 may be included in the housing 910, and force transfer may occur generally as referenced above in embodiment 800.

Primary differences between the illustrated embodiments 800 and 900 is that the illustrated embodiment 900 includes an endcap 920, contact member 930, and biasing member 940 similar to elements 420, 430, and 440 in FIG. 15.

While the positioning of the apparatus 900 may vary (based, for example, on the type of helmet), multiple apparatus 900 may be dispersed between the inner layer 91*b* and the outer layer 91*a*. Furthermore, the apparatus 900 may be alternately positioned, for example, several apparatus 900 may be coupled to the helmet such that the contact member 910 rests on the outside layer 91*a* of the helmet, and several apparatus 900 may be coupled to the helmet such that the contact member 930 rests on the inside layer 91*b* of the helmet. This configuration may help to dispel impact forces coming from more than one direction (i.e., the forces acting upon the outside surface of the helmet and the forces acting upon the inside surface of the helmet from a person's head).

Figure 27:
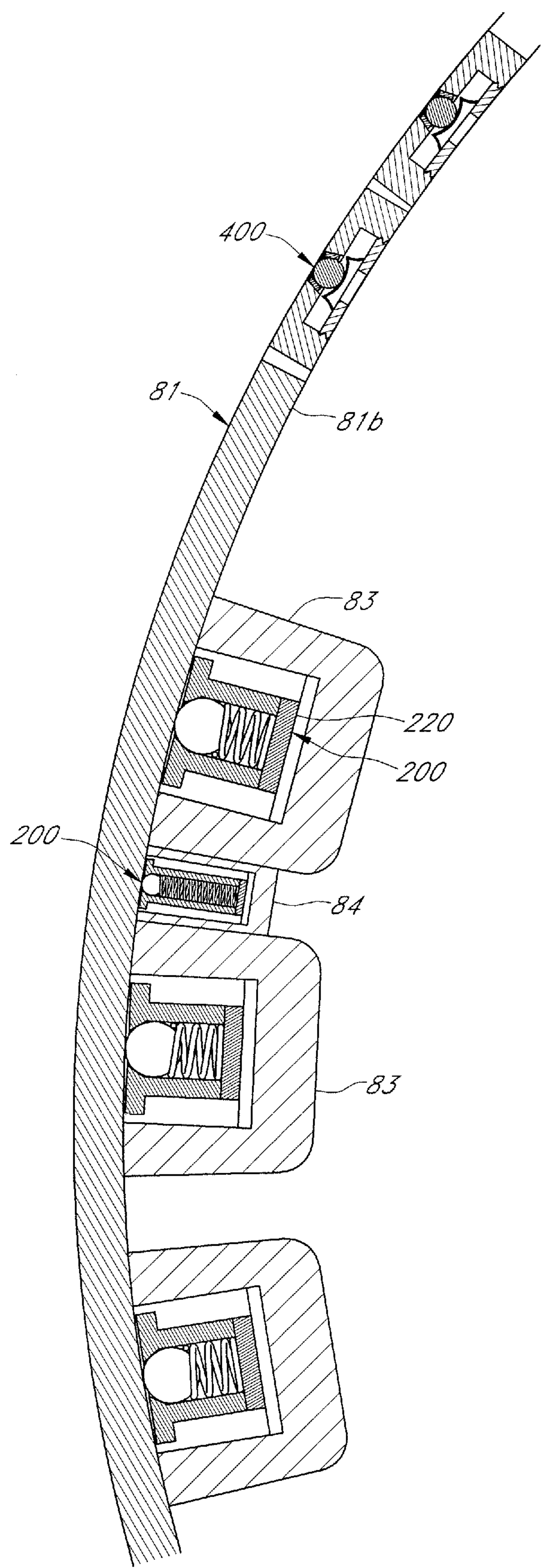
FIG. 27 is a section view of apparatus for dispersing impact forces shown located between the layers of a helmet and within pads on the helmet, according to various embodiments of the current invention.

FIG. 27 shows that the various apparatus for dispersing impact forces may be incorporated differently into a helmet. For example, a plurality of pads 83 of different shapes and sizes may be dispersed along inside layer 81*b* of helmet 81, and various embodiments described above may be positioned within the pads 83 (preferably with space between the endcap 220 and the pads 83). FIG. 27 specifically incorporates apparatus 200 in the pads 83. Force transfer may occur generally as referenced above in embodiments 800 and 900.

The positioning of the pads 83 on the inside surface 81*b* of the helmet 81 may be such that spaces exist between the pads 83. Various embodiments described above, may be configured to fit in another cushion 84 that can be positioned between the pads 83; a resized version of embodiment 200 is used here in FIG. 27. Clearly, other embodiments (such as 300 and 400, for example) may be used within the pads 83 and/or the cushions 84. Further, those skilled in the art may readily see benefits to incorporating apparatus between the layers of the helmet 81 (as described regarding embodiments 800 and 900, for example), within the pads 83 and the cushions 84.

Figure 28:
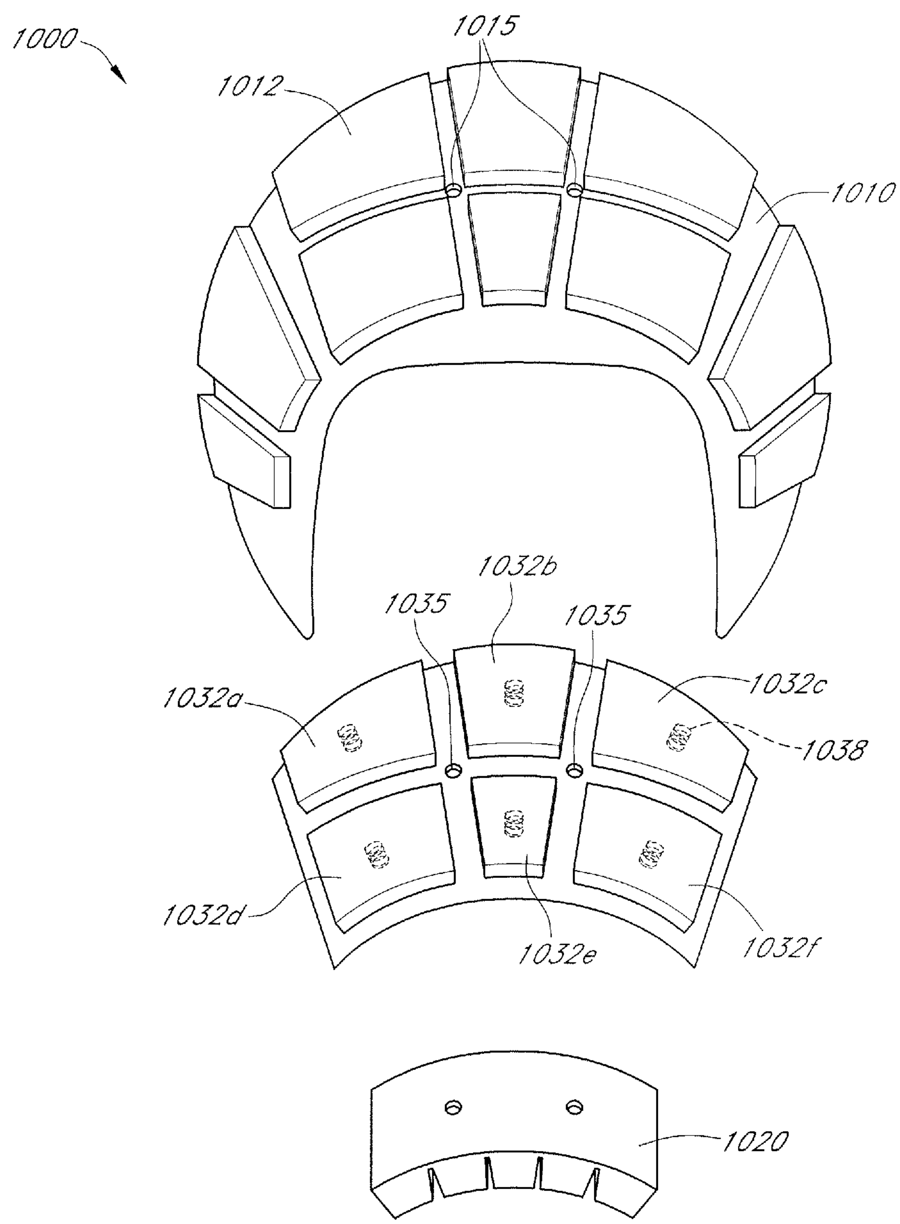
FIG. 28 is an exploded view of a system for mitigating harm due to impact forces according to one embodiment.
Figure 29:
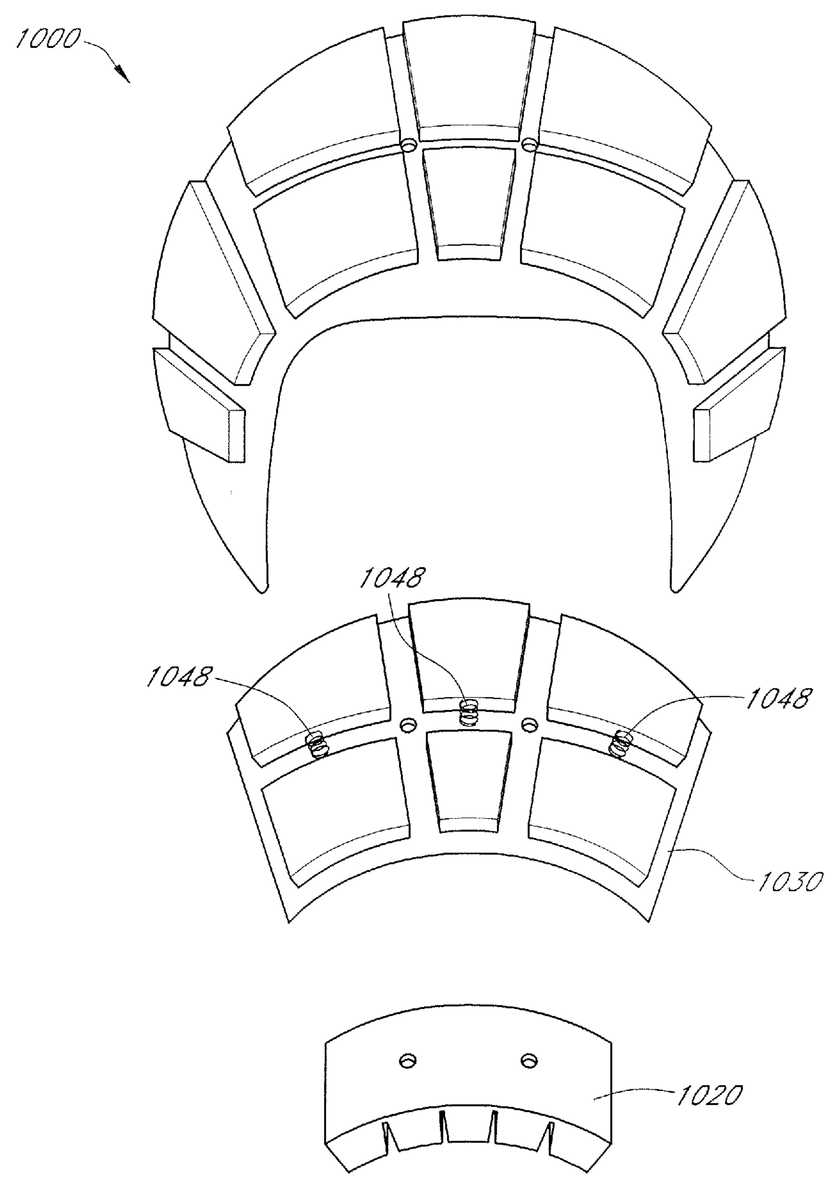
FIG. 29 is an exploded view of a system for mitigating harm due to impact forces according to another embodiment.
Figure 30:
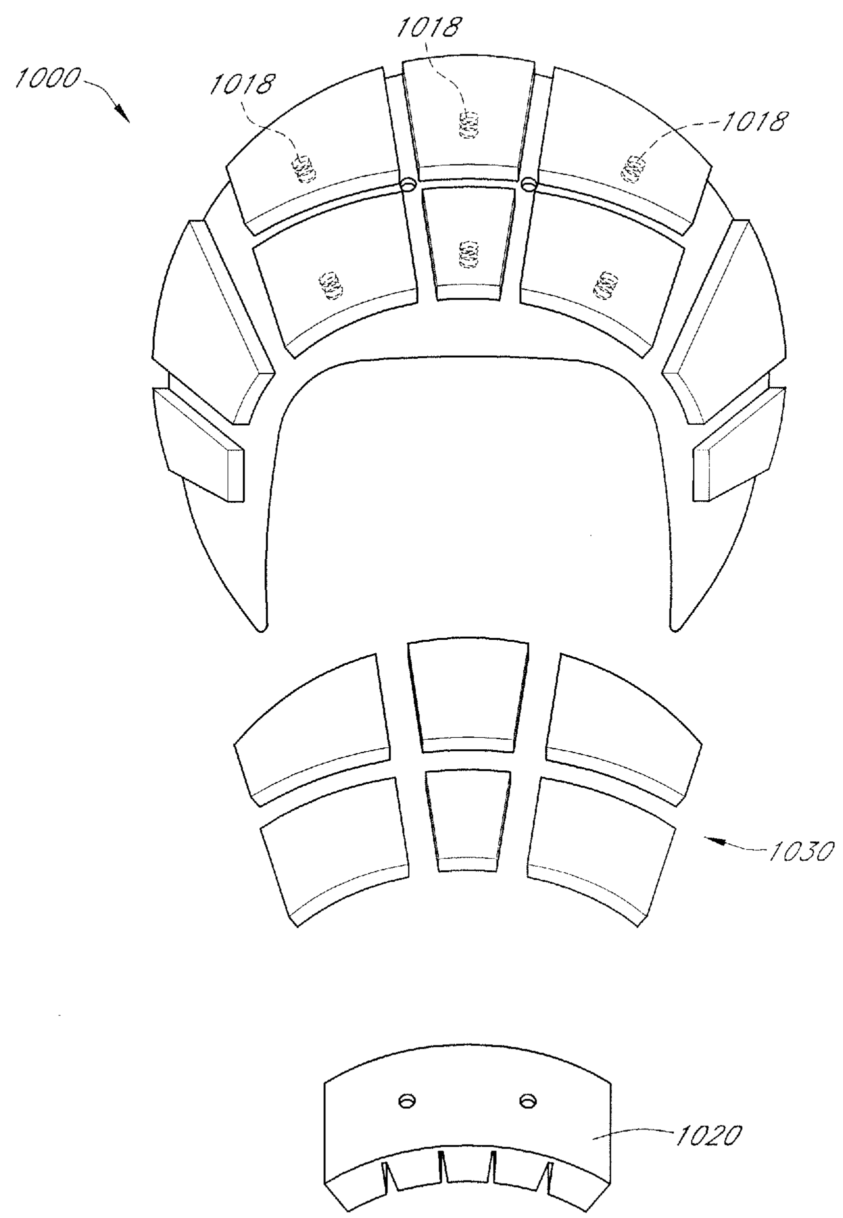
FIG. 30 is an exploded view of a system for mitigating harm due to impact forces according to still another embodiment.

FIGS. 28-30 show another system 1000 for mitigating harm due to impact forces. The system may include a first layer 1010, a second layer 1020, and an intervening plate 1030. The first layer 1010 may be, for example, the outer layer of a helmet. An additional layer (not shown) may overlay first layer 1010 to provide a smooth outer surface for the helmet.

The second layer 1020 layer may be, for example, a layer of padding on the inside surface of the helmet. As described above with reference to FIG. 27, various embodiments described above (e.g., 800, 900, et cetera) may be positioned within the pads. However, instead of the padding being positioned along the inside layer of the helmet, a space may be provided between the first layer 1010 and the second padding layer 1020. Therefore, the apparatus 800, 900 would be located entirely within the padding such that the contact member 830, 930 is not in direct contact with the helmet's inside surface 81*b* (but would rather be in contact with an interior or exterior edge of the second layer 1020). Force transfer may occur generally as discussed above with reference to embodiments 800 and 900.

The intervening plate 1030 may be disposed between the first and second layers 1010, 1020. Means for attaching the intervening plate 1030 to the first layer 1010 may be provided. For example, as shown in FIG. 29, springs 1048 located on the intervening plate 1030 may be secured to the underside of the first layer 1010 to hold the intervening plate 1030 in flexible communication with the first layer 1010.

The intervening plate 1030 may be equipped with transfer members 1032 which may be individually biased from the plate 1030 (e.g., 1032*a*, 1032*b*, 1032*c*, 1032*d*, 1032*e*, 1032*f*). Biasing members 1038 (for example, springs) may bias the transfer members 1032 toward the first layer 1010, as shown more clearly in FIG. 32. In this case, biasing members 1048 may hold the plate 1030 in place and provide additional tension to the system. Alternately, the transfer members 1032*a*, 1032*b*, 1032*c*, etc. may be biased directly from the second layer 1020 (e.g., without the intervening plate 1030).

Figure 31:
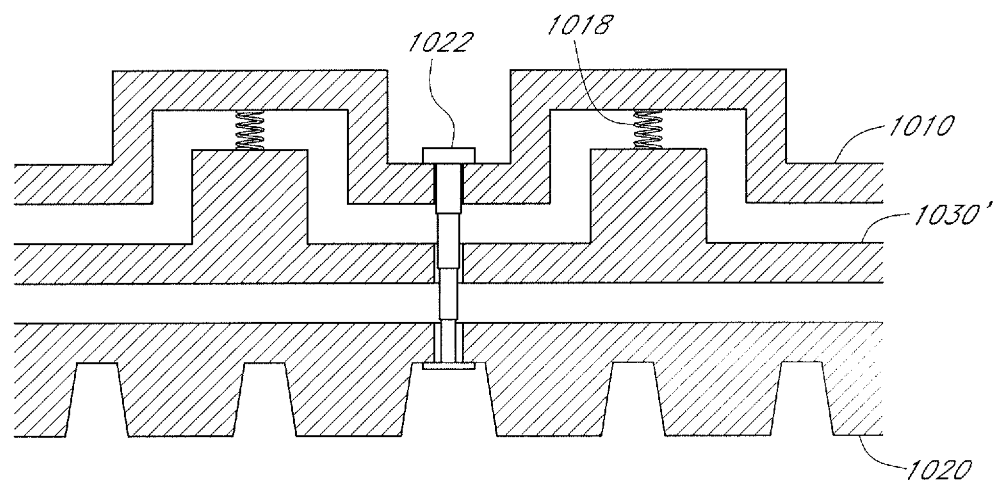
FIG. 31 is a section view of a system for mitigating harm due to impact forces incorporating a telescoping rivet, according to one embodiment.

Additionally, the transfer members 1032 and the intervening plate 1030 may form a unitary member 1030' (as shown more clearly in FIG. 31). For example, as shown in FIG. 30, biasing members 1018 may be secured between the first layer 1010 and the intervening plate 1030' to hold the plate 1030' in place. Here, the biasing members 1048 may not be necessary, although they could be included to provide additional tension to the system. The first layer 1010 may be equipped with recesses 1012 for receiving the transfer members 1032. As described above, an additional layer may overlay the first layer 1010 to provide a smooth outside surface, thereby "hiding" the recesses 1012.

Figure 32:
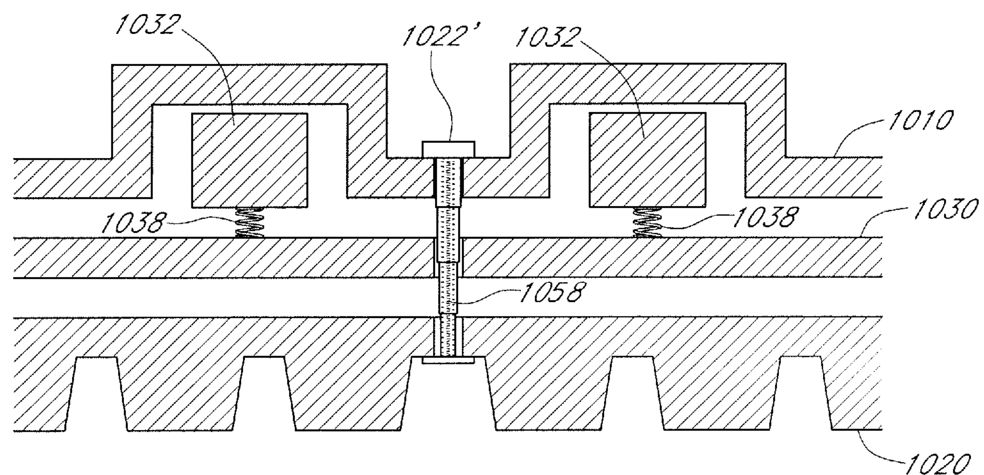
FIG. 32 is a section view of a system for mitigating harm due to impact forces incorporating a telescoping rivet having an internal biasing member, according to another embodiment.

As shown in FIGS. 31 and 32, alignment members 1022 (e.g., telescoping rivets) may be secured between apertures 1015, 1035 in the first layer 1010 and the intervening plate 1030, respectively. Additionally, the rivets 1022 may pass through apertures 1025 in the second layer 1020 to secure the second layer 1020 to the first layer 1010. The rivets 1022 may alternately be secured to the first layer 1010 and the second layer 1020 via adhesive, for example.

A biasing member 1058 (shown in FIG. 32) may also be included within the rivet 1022 to provide additional tension to the system 1000. In particular, FIG. 31 shows the use of a telescoping rivet 1022 with the intervening plate 1030 and the transfer members 1032 in a unitary construction. FIG. 32 shows the use of a telescoping rivet 1022' with the intervening plate 1030 having individually biased transfer members 1032. In addition, a biasing member 1058 is shown inside the rivet 1022'.

It shall be noted that either the rivet 1022 or 1022' may be used with either the unitary member 1030' or the intervening plate 1030 having individually biased transfer members 1032. It shall also be noted that biasing members 1018, 1038, 1048, and 1058 may be helical springs, magnetic springs, flat springs, gas springs, pneumatic springs, et cetera.

In some embodiments, other means of securing the first layer 1010 to the second layer 1020 may be utilized. For example, the second layer 1020 may be attached to the first layer via straps or a latching mechanism such as snaps, clips, zippers, et cetera. Corresponding snaps may be secured around the edge of the first layer 1010 and the second layer 1020 to snap the second layer 1020 into place. If clips are used, the second layer 1020 may be configured to snap into place around the outer perimeter of the first layer 1010.

In use, the system 1000 may act to mitigate the harmful effects of significant impact forces. When an impact force is received upon the first layer 1010, a portion of that force may be transferred to the various transfer members 1032 and biasing members 1018, 1038, 1048 to reduce the force received upon the wearer of the helmet. The biasing members 1018, 1038, 1048 may be altered for a short period of time, allowing the transfer members 1032 to move toward the plate 1030. If the impact force is sufficiently strong, the transfer members 1032 may contact the plate 1030 and move the plate 1030 toward the second layer 1020. Eventually, the biasing members 1018, 1038, 1048 may return the transfer members 1032 and the second layer 1030 to their initial positions pre-impact. The telescoping rivet 1022, 1022' may provide additional benefits when particularly hard forces are received upon the first layer 1010 by dispelling additional forces.

While the description of the invention is directed towards helmets, it should be noted that the invention may have use in other applications, including but not limited to other devices. For example, in shoes, the first layer 1010 may form a shoe sole and the second layer 1020 may form a layer for receiving a foot.

Figure 33:
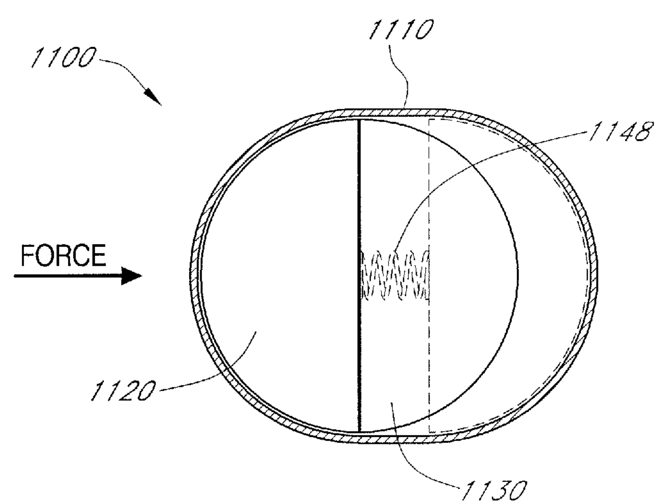
FIG. 33 is a section view of a face mask of a helmet according to one embodiment.

FIG. 33 shows another embodiment 1100 of the invention for mitigating harm due to impact forces shown in reference to a mask on a helmet. The mask 1100 may include a front portion 1120, a back portion 1130, and optionally a first layer 1110. As shown in FIG. 33, the front and back portions 1120, 1130 may be separably connected via a biasing member 1148. When force is applied in the direction of the arrow, a portion of the force is transferred to the biasing member 1148 and the back portion 1130 separates from an initial position adjacent the front portion 1120, as indicated by the dotted lines used to show movement of the back portion 1130. The biasing member 1148 and the back portion 1130 eventually return to the initial position. The first layer 1110 may protect a user from being pinched during separation of the front and back portions 1120, 1130. It should be noted that the biasing member 1148 may be helical springs, magnetic springs, flat springs, gas springs, pneumatic springs, et cetera.

FIGS. 34-43 show alternative embodiments of various apparatus incorporating sensors 1000 as part of the apparatus. The sensors 1000 may, for example, be enabled to detect movement of a surface in response to a force acting upon a surface, and to cause an alert to be activated.

Figure 34:
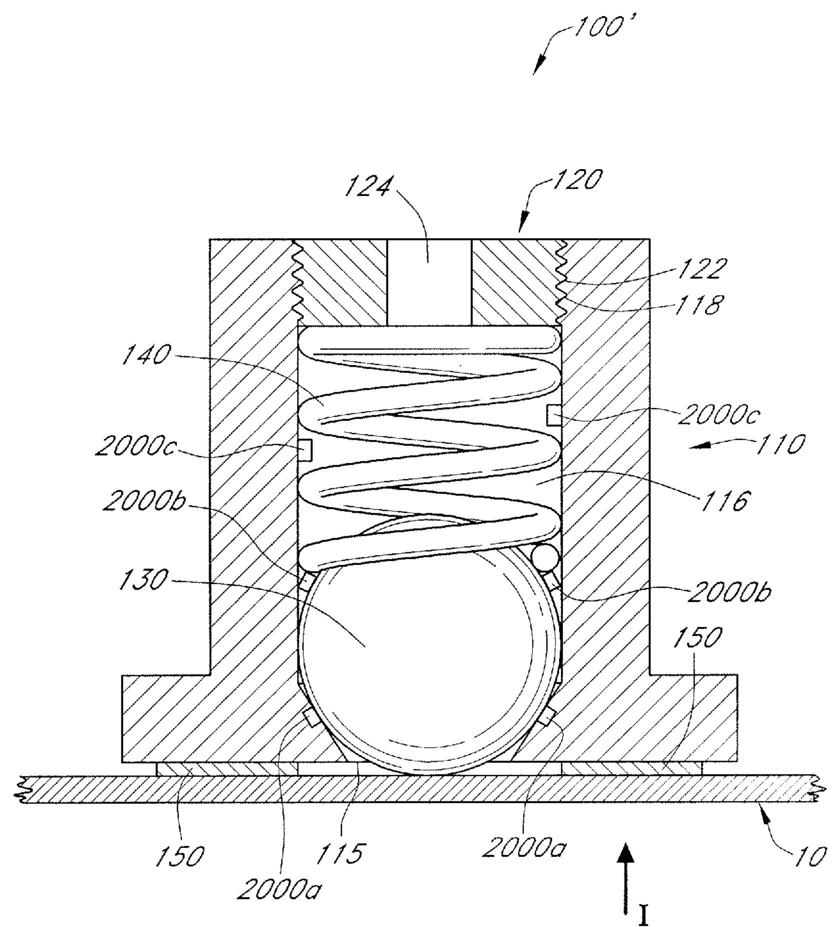
FIG. 34 is a side view of the apparatus of FIG. 1 in use, with various elements shown in section taken along line 3-3 in FIG. 1, and incorporating sensors.
Figure 35:
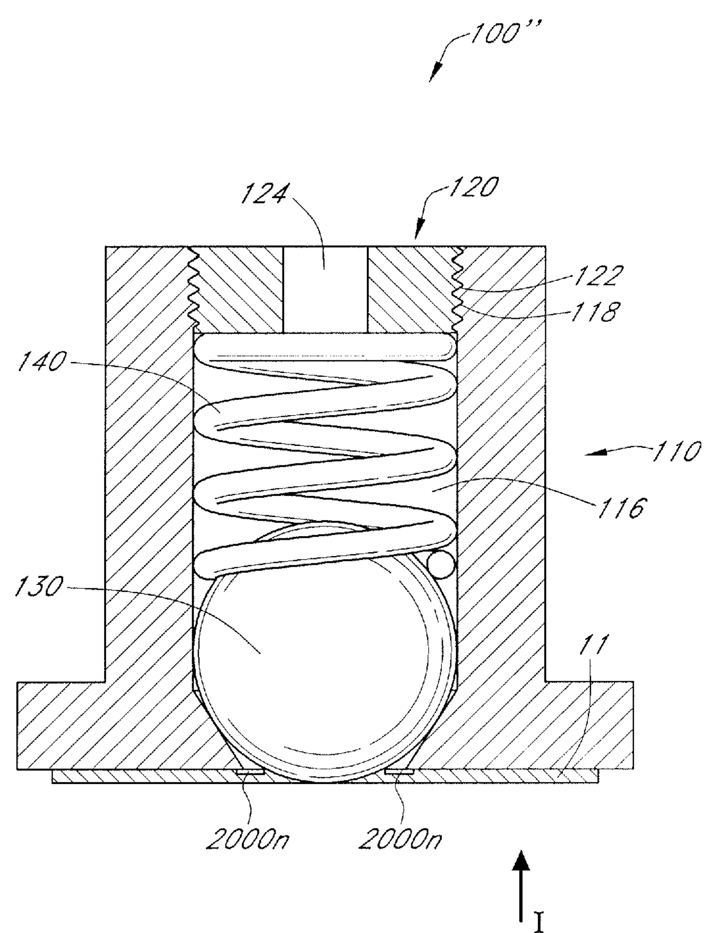
FIG. 35 is a side view of the apparatus of FIG. 6, taken along line 7-7 in FIG. 6 and further incorporating sensors.

FIGS. 34 and 35 show apparatus 100', 100" that are substantially similar to embodiment 100, except as specifically noted and/or shown, or as would be inherent. In FIG. 34, sensors 2000 are placed at various locations inside the housing 110 such that a force acting upon the sheet of glass 10 would trigger an alert. For example, sensors **2000*a* may be disposed along the walls of the housing 110 forming the cavity 116. The contact member 130 may be in constant contact with the sensors 2000*a*. When a force I acts upon the sheet of glass 10, the contact member 130 may be forced away from the sheet of glass 10. When the contact member 130 loses contact with the sensors 2000*a*, the sensors 2000*a* may recognize that the force I caused the contact member 130 to shift off of the sensors 2000*a*, thus triggering an alert. Alternately, the sensors 1000 can be placed along the walls of the housing 110 near the upper edge of the contact member 130, as shown at 2000*b*. When the force I causes the contact member 130 to shift, the contact member 130 encounters the sensors 2000*b*, thus triggering an alert. In another alternative, sensors 2000 may be placed along the walls of the housing 110 between coils in a biasing member 140 (which is a helical spring in FIG. 34), as shown at 2000*c*. When a force I acts upon the sheet of glass 10, the contact member 130 is pushed against the spring 140, and causing the coils to contract. As the coils contract, one or more of the coils may come into contact with the sensors 2000*c*, thus triggering an alert. As shown in FIG. 35, the sensors 2000*n* may alternately be located along a contact end 11, wherein the contact member 130 sits atop the contact end 11 and is in constant contact with the sensors 2000*n*. When a force is applied to the contact end 11, the contact member 130 loses contact with the sensors 2000*n***, thus triggering an alert.

Figure 36:
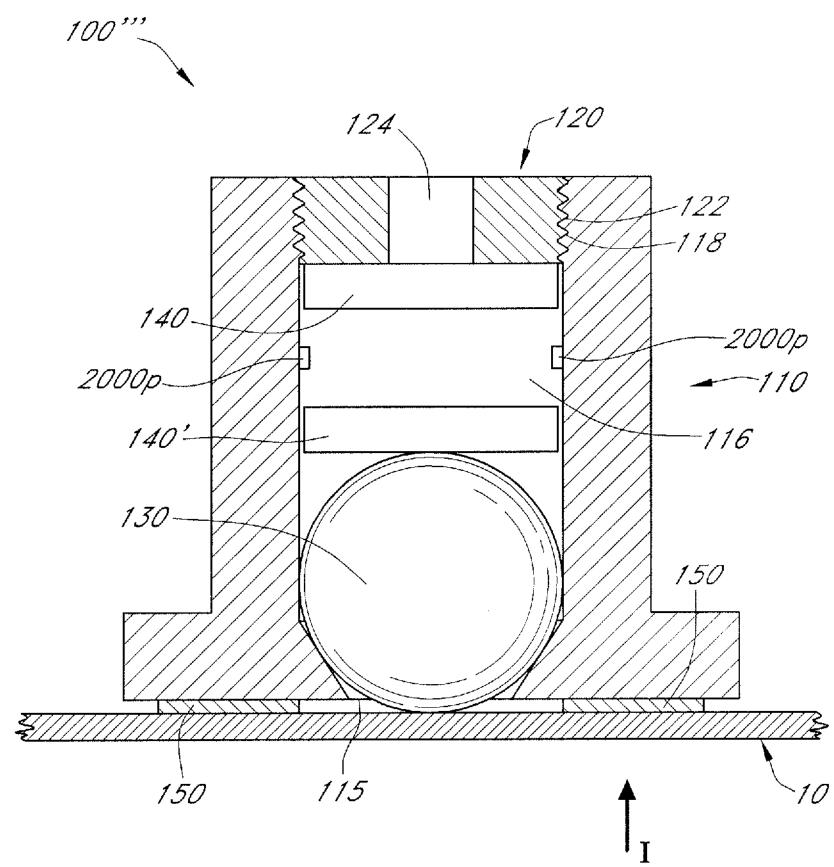
FIG. 36 is a side view of the apparatus of FIG. 1, taken along line 3-3 in FIG. 1, showing a magnetic spring and further incorporating sensors.

FIG. 36 shows an apparatus 100'" that is substantially similar to the embodiments described above with reference to FIGS. 34-35, except as specifically noted and/or shown, or as would be inherent. The difference between embodiment 100'" and those shown in FIGS. 34-35 is that the spring 140 in FIG. 36 is a magnetic spring rather than a helical spring. The sensors **2000*p* in FIG. 36 are shown in the cavity 116 of the housing 110. When a force is received upon the sheet of glass 10, the contact member 130 causes the magnet 140' to shift upwards. The magnet 140' may come into contact with the sensors 2000*p***, thus triggering an alert.

Figure 37:
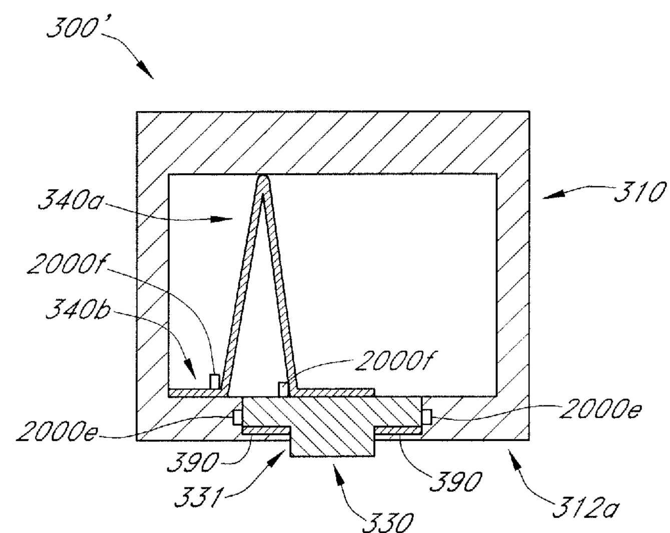
FIG. 37 is a section view of the apparatus of FIG. 8, taken along line 11-11 in FIG. 8, and further incorporating sensors.
Figure 38:
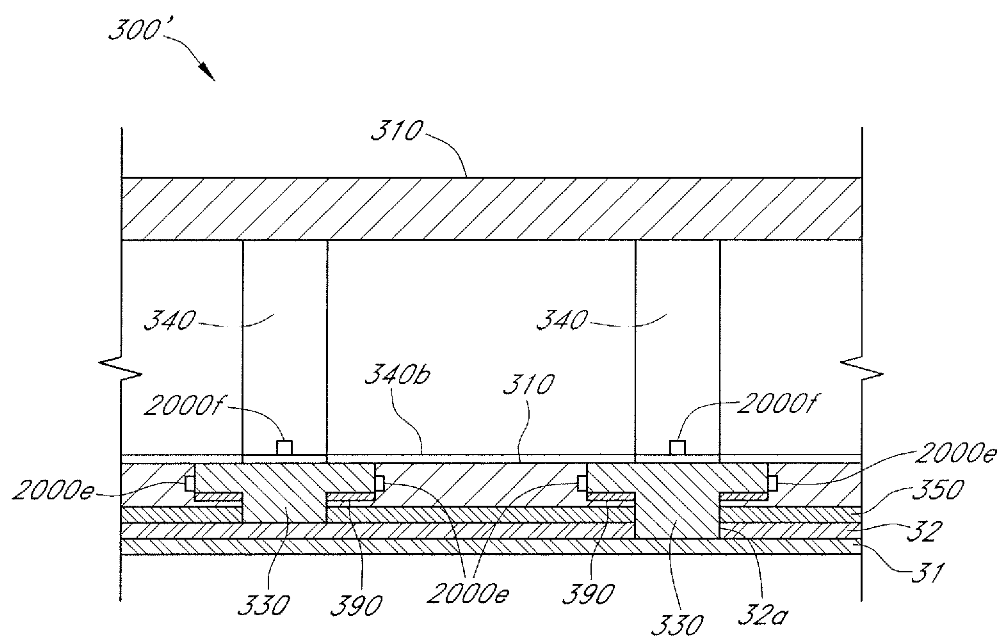
FIG. 38 is a section view of one embodiment of a glass product incorporating the apparatus of FIG. 8 and further incorporating sensors.

FIGS. 37 and 38 show an apparatus 300' that is substantially similar to embodiment 300, except as specifically noted and/or shown, or as would be inherent. Sensors 2000 may be located, for example, along the edges of the biasing member 340, as shown at **2000*e*. Alternately, sensors may be placed at various places on the biasing member 2000*f* such that movement of the biasing member triggers the sensors 2000** to initiate an alert.

Figure 39:
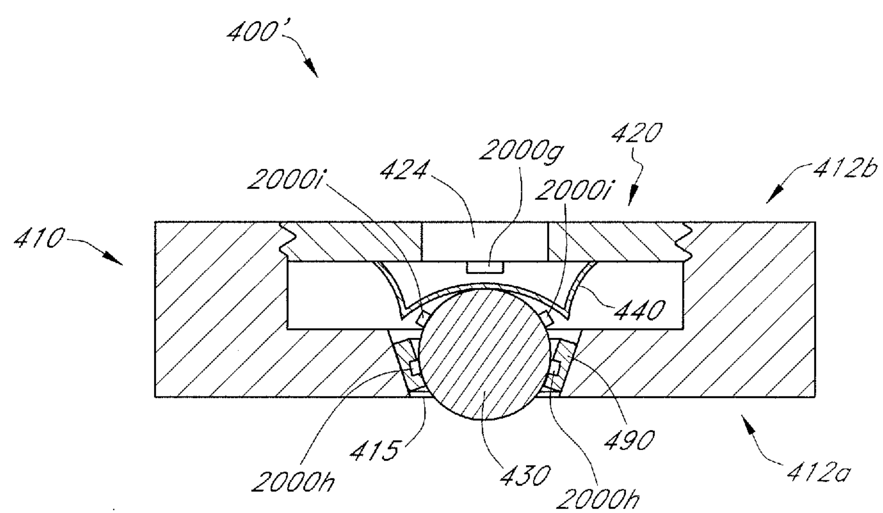
FIG. 39 is a section view of the apparatus of FIG. 13, with various elements shown in section taken along line 15-15 in FIG. 13, and further incorporating sensors.

FIG. 39 shows an apparatus 400' that is substantially similar to embodiment 400, except as specifically noted and/or shown, or as would be inherent. Sensors 2000 may be secured, for example, behind the biasing member 440, as shown at 2000g, such that movement of the contact member 430 causes the biasing member 440 to contact the sensor **2000*g*, thus triggering an alert. Alternately, the sensors may be located within the cushions 490 (as shown at 2000*h*), such that movement of the contact member 430 away from the cushion 490, or a return of the contact member 490 to the cushion 490 after a force has been received, activates the sensor 2000*h*. In another alternative, the sensors 2000 can be placed along the walls of the housing 410 near the upper edge of the contact member 430, as shown at 2000*i*. When the force I causes the contact member 430 to shift, the contact member 430 encounters the sensors 2000*i***, thus triggering an alert.

Figure 40:
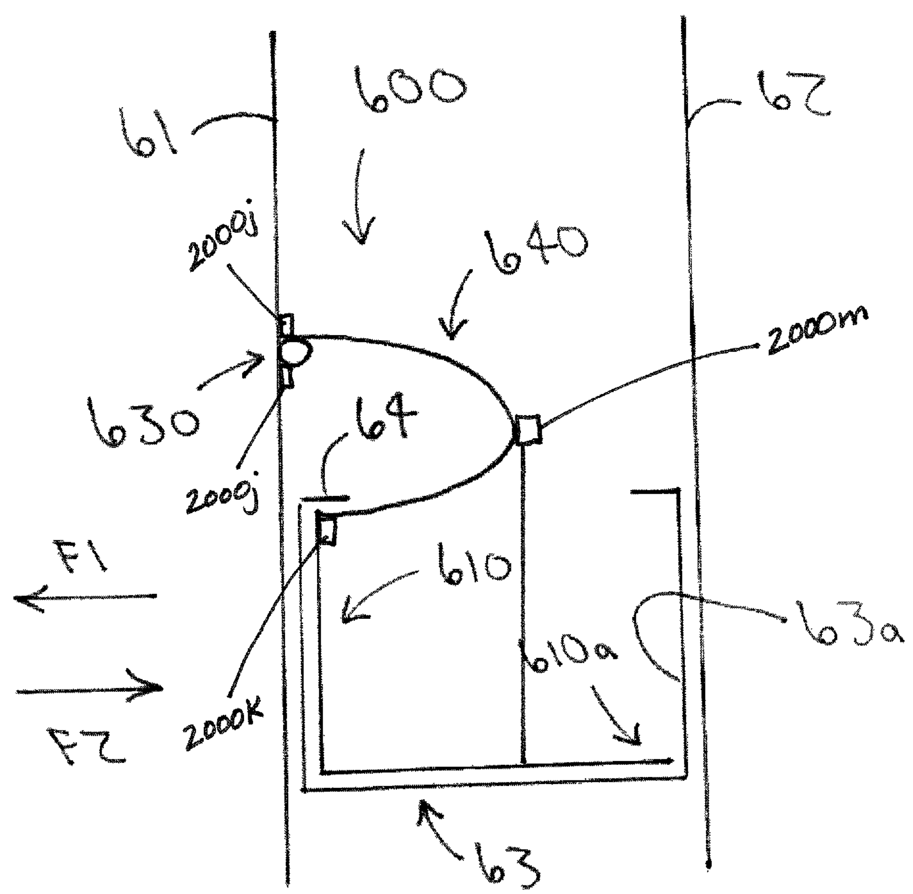
FIG. 40 is a side view of the apparatus and resulting glass product of FIG. 19, and further incorporating sensors.

FIG. 40 shows an apparatus 600' that is substantially similar to embodiment 600, except as specifically noted and/or shown, or as would be inherent. Sensors 2000 may be provided, for example, near where the contact member 630 rests upon the glass 61, as shown at **2000*j*, such that a force F2 received upon the glass 61 causes the contact member 630 to shift away from the glass 61, triggering the sensors 2000*j*. Alternately, the sensor may be located at the junction between the biasing member 640 and the base member 610, as shown at 2000*k*. When a force is received upon the surface of the glass 61, the biasing member 630 may be pushed away from the surface of the glass 61, thus engaging the sensor 2000*k*. In another alternative, a sensor 1000 may be supported behind the biasing member 640, as shown at 2000*m*. Again, a force F2 received upon the surface of the glass 61 causes the biasing member to shift, thus triggering the sensor 2000*m***.

Figure 41:
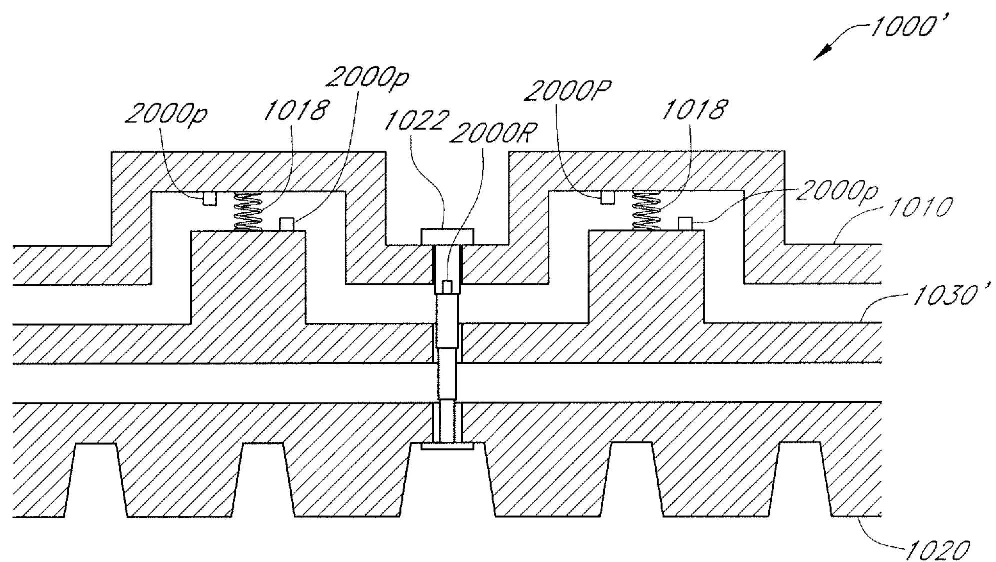
FIG. 41 is a section view of a system for mitigating harm due to impact forces incorporating a telescoping rivet, and further incorporating sensors.
Figure 42:
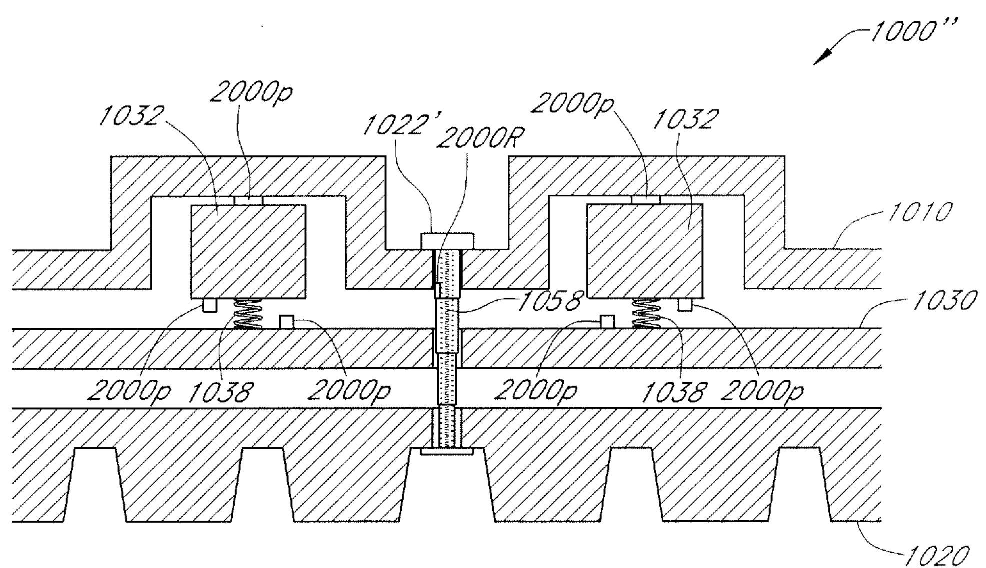
FIG. 42 is a section view of a system for mitigating harm due to impact forces incorporating a telescoping rivet having an internal biasing member and further incorporating sensors.

FIGS. 41 and 42 show systems 1000', 1000" that are substantially similar to embodiment 1000, except as specifically noted and/or shown, or as would be inherent. Sensors 2000 may be provided, for example, near the transfer members 1032, intervening plate 1030, and biasing members 1018, 1038 as shown at **2000*p* such that movement of the transfer members 1032, intervening plate 1030, and/or biasing members 1018, 1038 triggers the sensors 2000*p*. Alternately, the sensors 2000 may be located somewhere along the rivet 1022 as shown at 2000*r* such that movement of the rivet 1022 triggers the sensors 2000*r*. As described above, the sensors 2000 may be triggered by contact of the sensors 2000 with the transfer members 1032, intervening plate 1030, and/or biasing members 1018, 1038, by losing contact with the sensors 2000**, or by movement alone.

Figure 43:
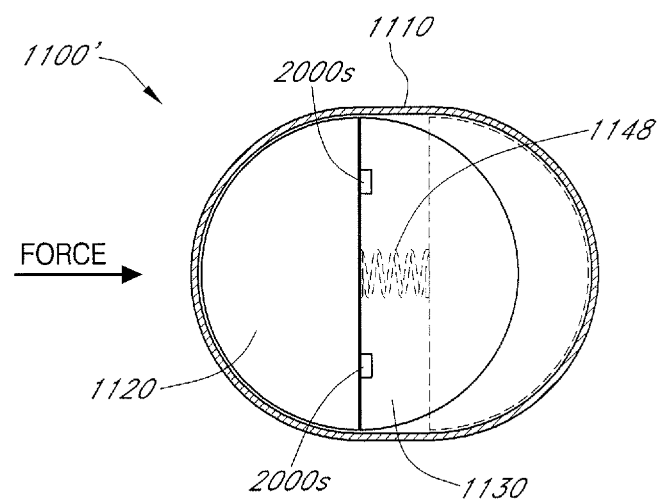
FIG. 43 is a section view of a face mask of a helmet according to one embodiment and further incorporating sensors.

FIG. 43 shows embodiment 1100' which is substantially similar to embodiment 1100, except as specifically noted and/or shown, or as would be inherent. Sensors 2000 may be provided, for example, along the separation point between the front portion 1120 and the back portion 1130 as shown at **2000*s*. In this way, the sensors 2000*s* may be triggered when contact between the sensors 2000*s* and the back portion 1130 is lost. Alternately, the sensors 2000*s* may be triggered when contact with the sensors 2000*s* is lost and regained, such as when the back portion 1030** leaves and subsequently returns to its original position.

It shall be understood that examples depicted in FIGS. 34-43 and described herein are exemplary only, and that the sensor(s) 2000 may be placed in any appropriate location such that movement of the biasing member caused by an impact force would cause the sensor 2000 to trigger an alert. Further, multiple sensors 2000 may be incorporated in an embodiment, and filtering criteria may be used to determine when to activate an alert. For example, an alert may be initiated only after two sensors 2000 detect movement.

Additionally, the sensors 2000 may be able to detect the amount of force exerted upon the surface of the glass 61 (or other surface). For example, multiple sensors 2000 may be located at various points within or along the housing 110. The amount of force exerted upon the contact surface may be determined by which sensor(s) 2000 are activated by movement of the contact member 130. The amount of force required to reach each sensor 2000 may be already known, such that if the contact member 130 contacts a first sensor 2000 along the walls of the housing 110 but not a second sensor located further from the contact member 130, the amount of force will be generally known. Alternately, the sensor(s) 2000 may be able to measure the amount of force exerted upon the contact surface and to report that information to a user.

Figure 44:
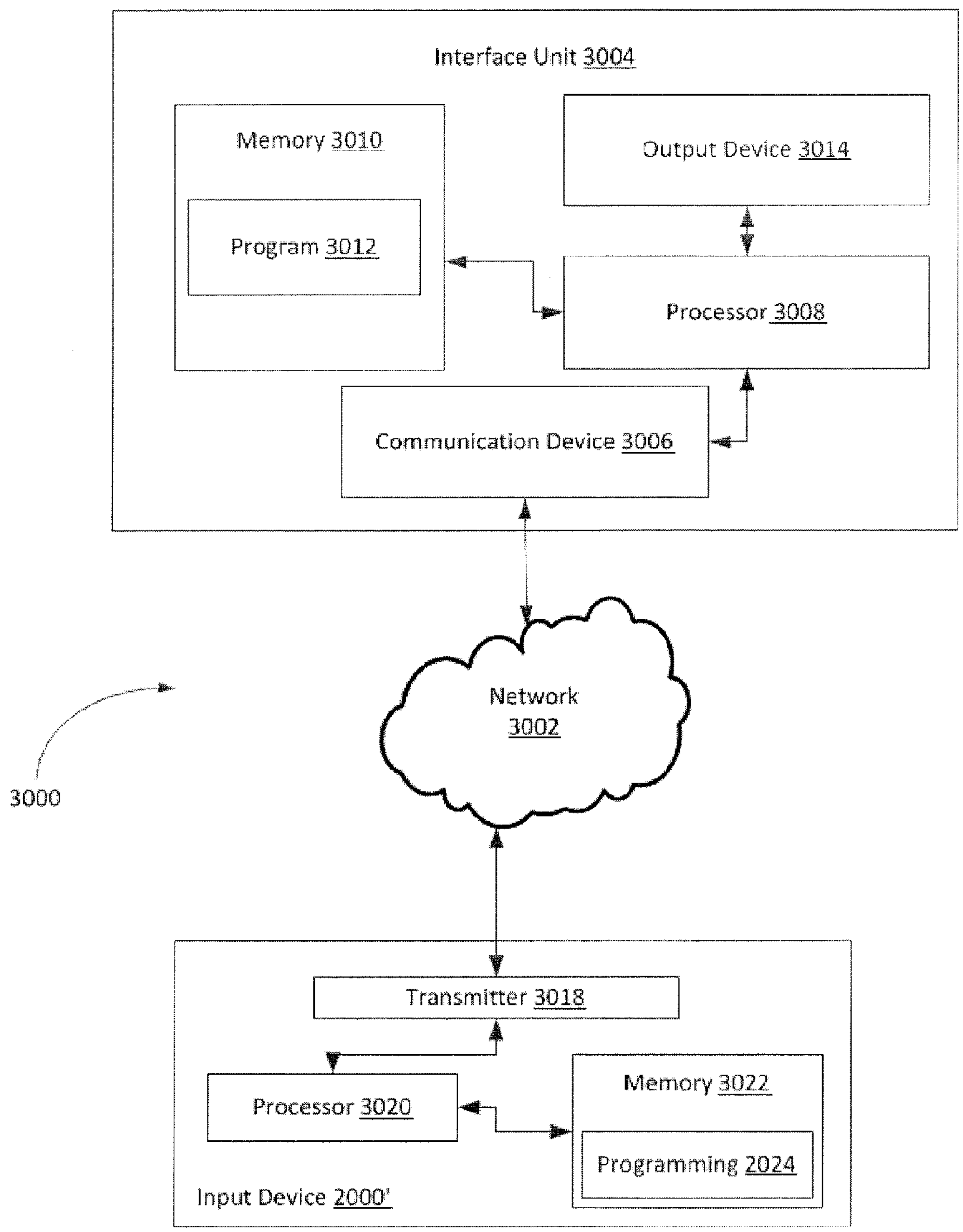
FIG. 44 is a block diagram of a system according to one embodiment of the current invention.

FIG. 44 illustrates a system 3000 incorporating apparatus for dispersing impact forces. The system 3000 may include an interface unit 3004 and a sensor 2000' in data communication over a network 3002. The interface unit 3004 may include a communication device 3006, a processor 3008, an output device 3014, and non-transitory computer memory 3010 having programming 3012.

The output device 3014 may be any appropriate device, whether now existing or later developed, for presenting data from the processor 3008. This may include, for example, one or more of: a printer, a monitor, a keyboard, a computer mouse, a touchpad, a speaker, a buzzer, a light, et cetera. The communication device 3006 may be any device, whether now known or later developed, that allows the system 3000 to communicate with the network 3002. For example, the communication device 3006 may be a switch, wireless router, wired modem, et cetera. The network 3002 may be the World Wide Web, a private or local network, or a cellular network, for example.

The interface unit 3004 may be, for example, a computer or smart phone associated with a monitoring system. Alternately, the interface unit 3004 may be a home alarm that alerts the homeowner that a force has been received upon a surface having an apparatus attached thereto.

The sensor 2000', as described above regarding the sensors 2000, may be located in or on various apparatus for dispersing impact forces. The sensor 2000' may include a transmitter 3018, a processor 3020, and non-transitory memory 3022 having programming 3024. Optionally, the processor 3020, memory 3022, and programming 3024 may be separate from the sensor 2000'.

Figure 45:
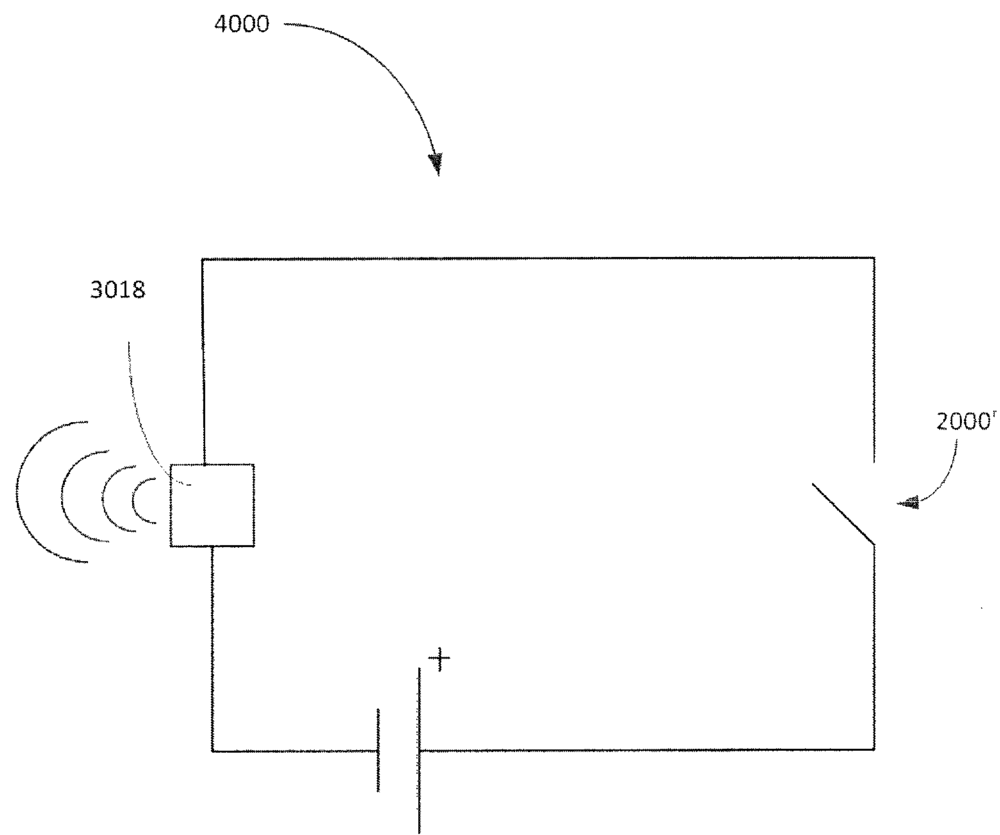
FIG. 45 is a circuit diagram of an input device as shown in FIG. 44.
Figure 46:
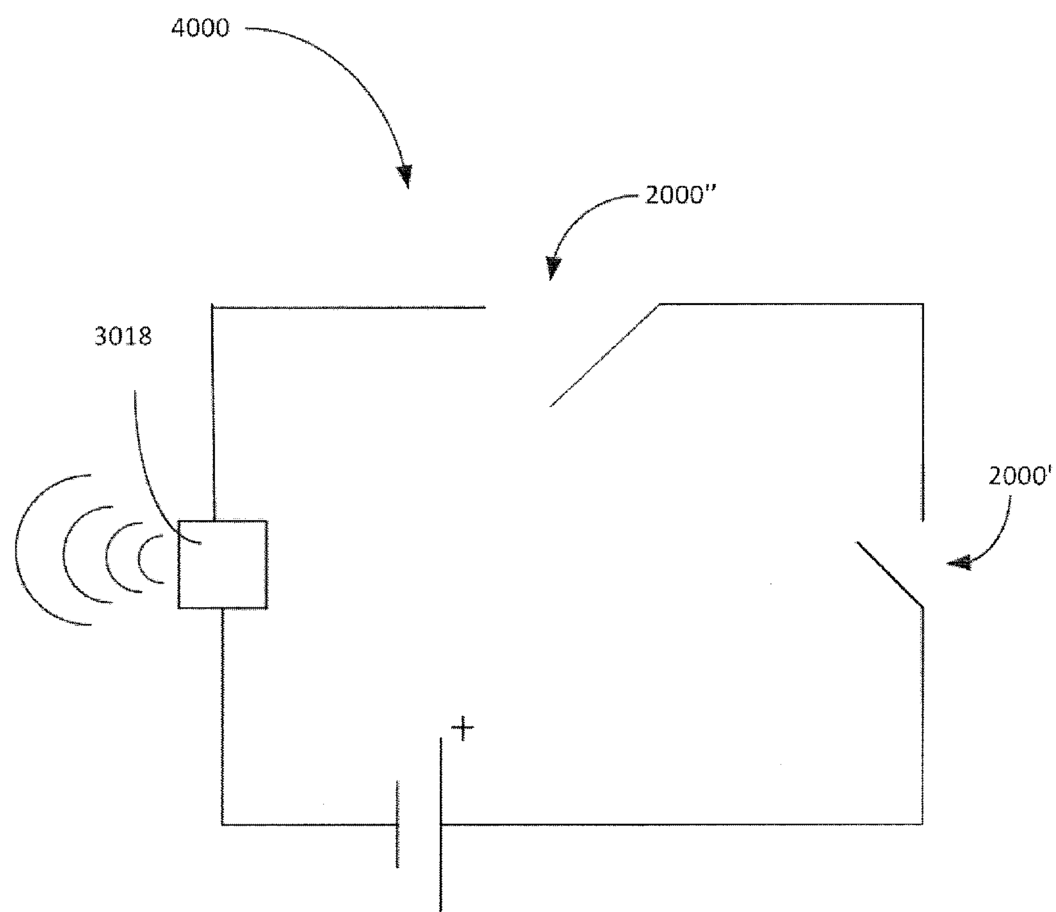
FIG. 46 is a circuit diagram of an input device as shown in FIG. 44 showing two switches.

In use, a force is received upon an impact surface, causing a contact member in an apparatus for dispersing impact forces (such as those described in embodiments 100', 100", 100'", 300', 400', and 600') to shift. The shift in the contact member to (or away from) the sensor 2000' may complete a circuit 4000 shown in FIG. 45, as generally described above regarding sensing in FIGS. 34-43, and the transmitter 3018 may send an alert. In another alternative (FIG. 46), the contact member may be required to activate (e.g., shift away from) a first sensor 2000' and also activate (e.g., contact) a second sensor 2000" before the transmitter 3018 emits an alert to the interface unit 3004.

Once an alert has been sent via the transmitter 3018, the processor 3008 may then recognize the signal and cause the output device 3014 to alert the user that the sensor 2000' has been triggered.

Figure 47:
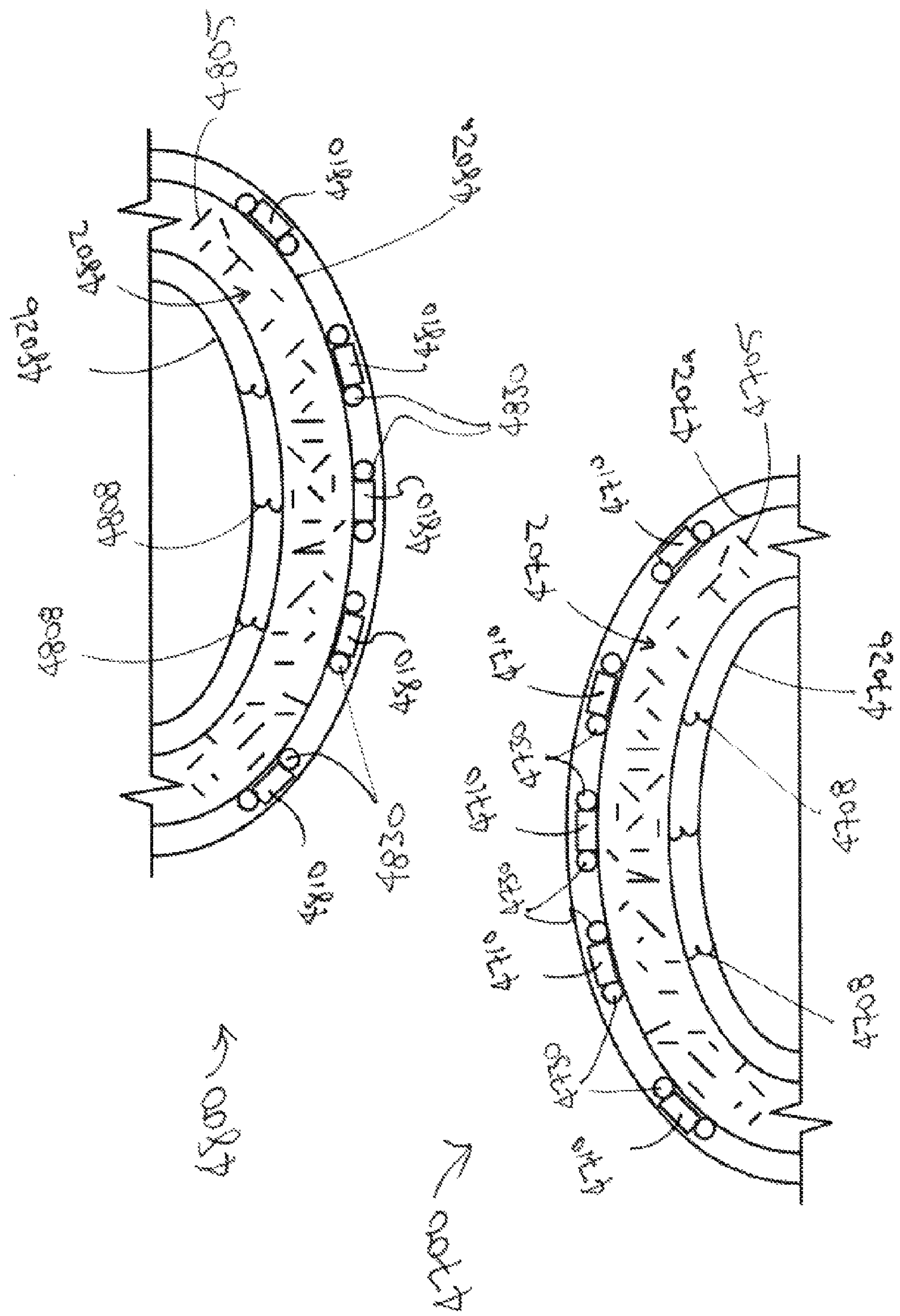
FIG. 47 is a cross-sectional diagram showing two helmets in communication via proximity sensors.
Figure 48:
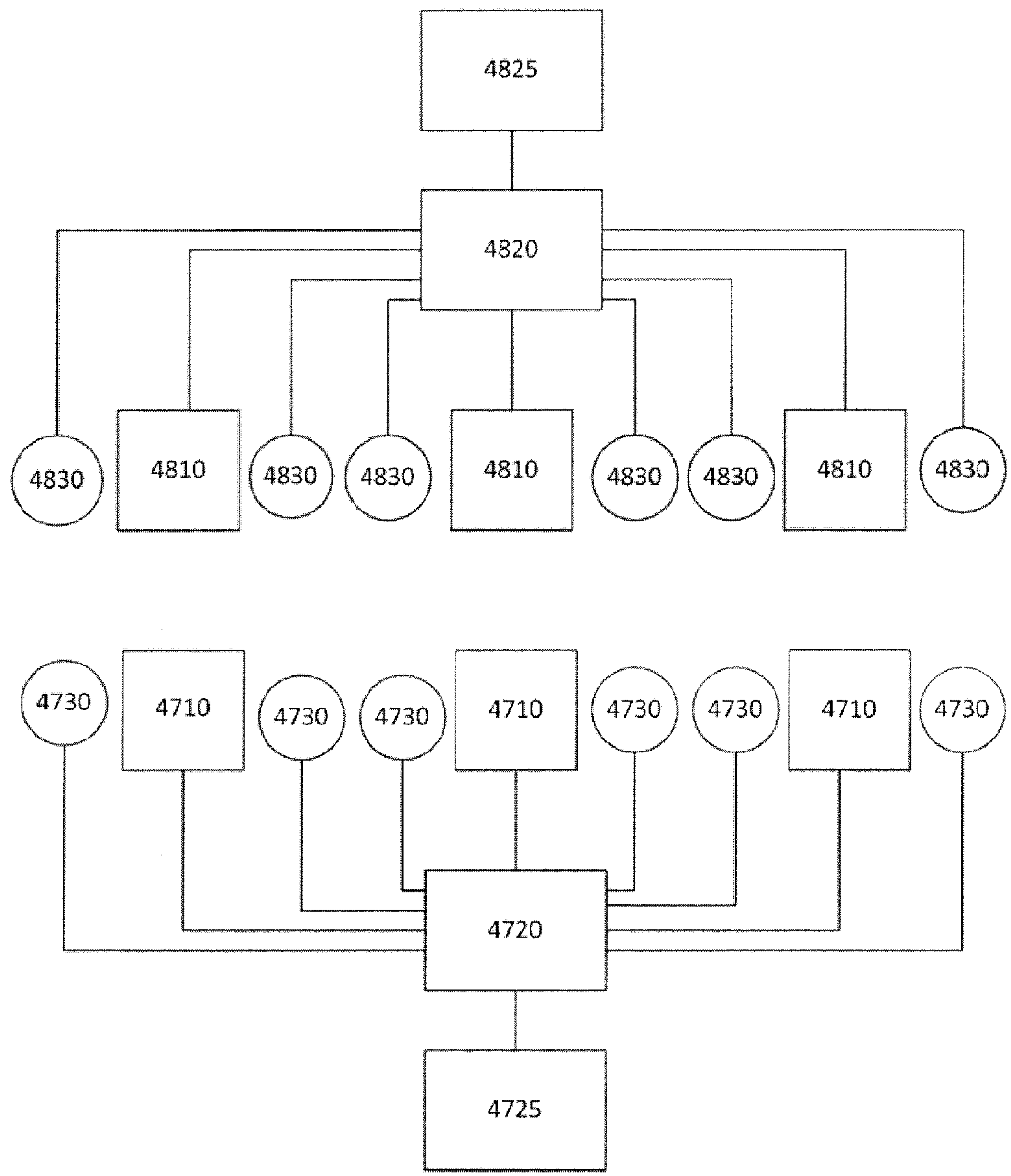
FIG. 48 is a circuit diagram of the proximity sensors as shown in FIG. 47.

Yet another system for mitigating head injuries is shown in FIGS. 47-48. Here, two helmets 4700, 4800 (shown in cross-section diagram) each include a plurality of dispersed proximity sensors 4710, 4810 such that the proximity sensors 4710 of the first helmet 4700 are in communication with the proximity sensors 4810 of the second helmet 4800, and specifically such that: (a) the proximity sensors 4710 can indicate what part of the helmet 4700 is closest to the helmet 4800; and (b) the proximity sensors 4810 can indicate what part of the helmet 4800 is closest to the helmet 4700. As shown in FIG. 48, the proximity sensors 4710, 4810 may be in data communication with one or more processor 4720, 4820 and non-transitory computer memory 4725, 4825. The memory 4725, 4825 includes programming to effectuate the steps and functions described herein, as well as other steps and functions that may be desired. Dispersed electromagnets 4730 are in communication with the processor 4720, and other dispersed electromagnets 4830 are in communication with the processor 4820.

As shown in FIG. 47, each helmet 4700, 4800 has a cavity 4702, 4802 between external and internal walls **4702*a*, 4702*b*, 4802*a*, 4802*b*, and ferromagnetic material 4705, 4805 (e.g., iron shavings) is located in each cavity 4702, 4802**.

The processors 4720, 4820 may constantly (or periodically) review data from the proximity sensors 4710, 4810 to determine if the helmets 4700, 4800 are within a predetermined distance of each other, and more specifically what parts of the helmets 4700, 4800 are nearest one another. Upon the processor 4720 determining that a particular part of the helmet 4700 is nearest to the helmet 4800, the processor 4720 may actuate one or more of the electromagnets 4730 that is closest to the potential impact location. This in turn may attract the ferromagnetic material 4705 to the potential impact location. Similarly, upon the processor 4820 determining that a particular part of the helmet 4800 is nearest to the helmet 4700, the processor 4820 may actuate one or more of the electromagnets 4830 that is closest to the potential impact location—in turn attracting the ferromagnetic material 4805 to the potential impact location.

Upon subsequent impact between the helmet 4700 and the helmet 4800, part of the impact force on the helmet 4700 may be absorbed and dissipated by overcoming the magnetic force acting on the ferromagnetic material 4705. Moreover, an impact plate 4707 in the cavity 4702 (e.g., biased from the wall **4702*a* or the wall 4702*b*, by a biasing member 4708, such as a flat spring, a helical spring, a magnetic spring, a liquid spring, or a gas spring) may receive and distribute force transferred by the ferromagnetic material 4705. Similarly, upon subsequent impact between the helmet 4800 and the helmet 4700, part of the impact force on the helmet 4800 may be absorbed and dissipated by overcoming the magnetic force acting on the ferromagnetic material 4805. And an impact plate 4807 in the cavity 4802 (e.g., biased from the wall 4802*a* or the wall 4802*b* by a biasing member 4808, such as a flat spring, a helical spring, a magnetic spring, a liquid spring, and a gas spring) may receive and distribute force transferred by the ferromagnetic material 4805**.

The helmets 4700, 4800 may further incorporate any of the other force-dispersing apparatus discussed above—for example as described with reference to FIGS. 24-27.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Various steps in described methods may be undertaken simultaneously or in other orders than specifically provided.

I claim:

1. A system for mitigating an impact force, the system comprising:

a device having a first layer, a second layer, and an intervening member;

wherein the intervening member is suspended between the first and second layers via a first biasing member;

whereby:

a first portion of a force initially received by the first layer is transferred to the intervening member;

a fraction of the force transferred to the intervening member is returned to the first layer, the fraction returned to the first layer being less than the force received by the first layer; and a second portion of the force initially received by the first layer is partially transferred to the second layer, the second portion being less than the initial force received by the first layer;

wherein the second layer includes padding having an interior edge and an exterior edge, comprising:

a supplemental biasing member, comprising:

(a) a housing having a contact end with an aperture;

(b) a contact member disposed at least primarily inside the housing; and (c) a biasing member biasing the contact member toward the housing aperture;

wherein the housing contact end is coupled to either the second layer interior edge or the second layer exterior edge;

whereby sequentially;

(i) the contact member receives a subportion of the second portion of the force initially received by the first layer;

(ii) the subportion is transferred from the second layer to the biasing member via the contact member; and (iii) a part of the subportion is returned to the second layer, the part of the subportion being less than 100% of the subportion.

2. The system of claim 1, wherein the first layer is in communication with the second layer via at least one of: an alignment member, a strap, and a latching mechanism.

3. The system of claim 2, wherein the alignment member is a telescoping rivet.

4. The system of claim 3, wherein the telescoping rivet further includes a second biasing member.

5. The system of claim 4, wherein the second biasing member is selected from the group consisting of: a flat spring, a helical spring, a magnetic spring, a liquid spring, and a gas spring.

6. A system for mitigating an impact force, the system comprising:

a device having a first layer, a second layer, and an intervening member;

a plurality of transfer members, each transfer member being individually biased from the intervening member toward the first layer;

wherein the intervening member is suspended between the first and second layers via a first biasing member;

whereby:

a first portion of a force initially received by the first layer is transferred to the intervening member;

a fraction of the force transferred to the intervening member is returned to the first layer, the fraction returned to the first layer being less than the force received by the first layer; and a second portion of the force initially received by the first layer is partially transferred to the second layer, the second portion being less than the initial force received by the first layer;

wherein a first portion of the force initially received by the first layer is transferred to the plurality of transfer members, thereby moving at least one of the transfer members; and wherein the intervening members travel away from the first layer upon receiving at least a predetermined force from at least one of the transfer members.

7. A system for mitigating an impact force, the system comprising:

a device having a first layer, a second layer, and an intervening member;

at least one sensor that initiates an alert when the intervening member receives a predetermined amount of force;

wherein the intervening member is suspended between the first and second layers via a first biasing member;

whereby:

a first portion of a force initially received by the first layer is transferred to the intervening member;

a fraction of the force transferred to the intervening member is returned to the first layer, the fraction returned to the first layer being less than the force received by the first layer; and a second portion of the force initially received by the first layer is partially transferred to the second layer, the second portion being less than the initial force received by the first layer.

8. The system of claim 7, wherein the first layer is selected from the group consisting of a helmet outside layer, a sole of a shoe, an outside layer of a racquet handle, and a rifle stock.

9. A system for mitigating an impact force, the system comprising:

a device having a first layer, a second layer, and an intervening member;

wherein the intervening member is suspended between the first and second layers via a first biasing member;

wherein the first layer is a helmet outside layer;

whereby:

a first portion of a force initially received by the first layer is transferred to the intervening member;

a fraction of the force transferred to the intervening member is returned to the first layer, the fraction returned to the first layer being less than the force received by the first layer; and a second portion of the force initially received by the first layer is partially transferred to the second layer, the second portion being less than the initial force received by the first layer.

10. The system of claim 9, wherein the first biasing member is between the intervening member and the first layer.

11. The system of claim 9, wherein the first biasing member is between the intervening member and the second layer.

12. A system for mitigating head injuries, comprising:

a helmet having:

a hard outer layer;

a padded inner layer; and an intervening layer suspended between the outer layer and the inner layer via a first biasing member;

wherein an alignment member secures the outer layer to the inner layer, the alignment member being telescopic and having a second biasing member;

whereby:

a first portion of a force initially received by the outer layer is transferred to the intervening member;

a fraction of the force transferred to the intervening member is returned to the outer layer, the fraction returned to the outer layer being less than the force received by the outer layer; and a second portion of the force initially received by the outer layer is partially transferred to the inner layer, the second portion being less than the initial force received by the outer layer.

13. The system of claim 12, wherein the first and second biasing members are selected from the group consisting of: a flat spring, a helical spring, a magnetic spring, a liquid spring, and a gas spring.

14. The system of claim 13, further comprising a plurality of transfer members, each transfer member being individually biased from the intervening member toward the outer layer, wherein:

a portion of the force initially received upon the outer layer is transferred to the plurality of transfer members thereby moving at least one of the transfer members; and wherein the intervening member travels away from the outer layer upon receiving at least a predetermined force from at least one of the transfer members.

15. The system of claim 14, further comprising at least one sensor that initiates an alert when a force is received on the first or second layer.

16. The system of claim 15, further comprising:

a plurality of proximity sensors;

a plurality of electromagnets;

ferromagnetic material;

wherein:

the proximity sensors and electromagnets are in data communication with a processor and non-transitory computer memory; and the memory includes programming to effectuate the steps of:

(1) determining a potential impact location; and (2) actuating one or more electromagnets to attract the ferromagnetic material to the potential impact location.

17. The system of claim 12, further comprising:

a plurality of proximity sensors;

a plurality of electromagnets;

ferromagnetic material;

wherein:

the proximity sensors and electromagnets are in data communication with a processor and non-transitory computer memory; and the memory includes programming to effectuate the steps of:

(1) determining a potential impact location; and (2) actuating one or more electromagnets to attract the ferromagnetic material to the potential impact location.

18. A system for mitigating an impact force, comprising:

a first helmet comprising:

an outer layer;

an inner layer; and an impact plate suspended between the outer layer and the inner layer via a first biasing member;

a plurality of proximity sensors;

a plurality of electromagnets; and ferromagnetic material;

wherein:

the proximity sensors and the electromagnets are in data communication with a processor and non-transitory computer memory; and the memory includes programming to effectuate the steps of:

(1) determining the proximity of the first helmet to a second helmet;

(2) determining a potential impact location of the first helmet with the second helmet; and (3) actuating one or more of the electromagnets to attract the ferromagnetic material to the potential impact location;

whereby:

a portion of an impact force between the first and second helmets is dissipated by overcoming the electromagnet attraction of the ferromagnetic material; and another portion of the impact force is transferred to the impact plate.

* * * * *